United States Patent
Khoshnevisan et al.

(10) Patent No.: US 11,627,597 B2
(45) Date of Patent: Apr. 11, 2023

(54) UPLINK CONFIGURED GRANTS USING MULTI-DOWNLINK CONTROL INFORMATION MESSAGING BASED FRAMEWORK

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 17/173,393

(22) Filed: Feb. 11, 2021

(65) Prior Publication Data
US 2021/0289540 A1 Sep. 16, 2021

Related U.S. Application Data

(60) Provisional application No. 62/990,222, filed on Mar. 16, 2020.

(51) Int. Cl.
*H04W 72/14* (2009.01)
*H04W 72/04* (2009.01)
(Continued)

(52) U.S. Cl.
CPC ........... *H04W 72/14* (2013.01); *H04L 1/1812* (2013.01); *H04W 72/0406* (2013.01); *H04W 72/1268* (2013.01)

(58) Field of Classification Search
CPC ..... H04L 1/1812; H04L 1/1822; H04L 1/188; H04L 1/1887; H04L 1/189;
(Continued)

(56) References Cited

U.S. PATENT DOCUMENTS 10,965,434 B1 *  3/2021  Babaei ................. H04L 5/0096
2021/0105096 A1 *  4/2021  Chin ..................... H04L 1/1822
(Continued)

OTHER PUBLICATIONS

International Search Report and Written Opinion—PCT/US2021/017836—ISA/EPO—dated Jun. 1, 2021.
(Continued)

*Primary Examiner* — Hassan A Phillips
*Assistant Examiner* — Hicham B Foud
(74) *Attorney, Agent, or Firm* — Qualcomm Incorporated

(57) ABSTRACT

Methods, systems, and devices for wireless communications are described. A communication device, otherwise known as a user equipment (UE) may determine a first uplink configured grant configuration corresponding to a first value of a control resource set (CORESET) pool index, and determine a second uplink configured grant configuration corresponding to a second value of the CORESET pool index different from the first value of the control resource set pool index. The UE may transmit a first uplink transmission during a first uplink grant occasion according to the first uplink configured grant configuration and a second uplink transmission during a second uplink grant occasion according to the second uplink configured grant configuration. Both the first uplink transmission and the second uplink transmission may correspond to a same transport block and a hybrid automatic repeat request (HARQ) identifier.

30 Claims, 22 Drawing Sheets

(51) Int. Cl.
*H04W 72/12* (2009.01)
*H04L 1/18* (2006.01)
*H04L 1/1812* (2023.01)
*H04W 72/1268* (2023.01)

(58) Field of Classification Search
CPC .......... H04L 2001/0092; H04L 5/0053; H04L 5/0055; H04L 5/0078; H04L 5/0094; H04W 72/0406; H04W 72/1268; H04W 72/14

See application file for complete search history.

(56) References Cited

U.S. PATENT DOCUMENTS

| | | | | |
|---|---|---|---|---|
| 2021/0168779 | A1* | 6/2021 | Mondal | H04W 72/10 |
| 2022/0052727 | A1* | 2/2022 | Sun | H04L 1/1861 |
| 2022/0061074 | A1* | 2/2022 | Babaei | H04L 5/0053 |
| 2022/0078772 | A1* | 3/2022 | Chen | H04L 1/1861 |
| 2022/0264537 | A1* | 8/2022 | Shi | H04W 72/02 |

OTHER PUBLICATIONS

Mediatek Inc: "Issues on Retransmissions Across Different Configured Grant Configurations", 3GPP Draft, R2-2000841, 3GPP TSG-RAN WG2 Meeting #109-e, 3rd Generation Partnership Project (3GPP), Mobile Competence Centre, 650, Route Des Lucioles, F-06921 Sophia-Antipolis Cedex, France, vol. RAN WG2, no. Electronic meeting, Feb. 24, 2020-Mar. 6, 2020, Feb. 13, 2020 (Feb. 13, 2020), XP051848632, 3 Pages, Retrieved from the Internet: URL:https://ftp.3gpp.org/tsg_ran/WG2_RL2/TSGR2_109_e/Docs/R2-2000841.zip, R2-2000841 Retransmissions across different CGs. docx [retrieved on Feb. 13, 2020] p. 2, Paragraph 3.

OPPO: "Enhancements on Multi-TRP and Multi-Panel Transmission", 3GPP Draft, R1-1911843, 3GPP TSG RAN WG1 Meeting #99. 3rd Generation Partnership Project (3GPP), Mobile Competence Centre, 650, Route Des Lucioles, F-06921 Sophia-Antipolis Cedex, France, vol. RAN WG1. no. Reno. USA, Nov. 18, 2019-Nov. 22, 2019, Nov. 8, 2019 (Nov. 8, 2019), XP051819864, 11 Pages, Retrieved from the Internet: URL:https://ftp.3gpp.org/tsg_ran/WG1_RL1/TSGR1_99/Docs/R1-1911843.zip, R1-1911843.doc [retrieved on Nov. 8, 2019] Section 2.1.

VIVO: "Further Discussion on Enhancement of MTRP Operation", 3GPP Draft, R1-2007645, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1. no. e-Meeting, Oct. 26, 2020-Nov. 13, 2020, Oct. 24, 2020 (Oct. 24, 2020), XP051946454, 15 Pages, Retrieved from the Internet: URL:https://ftp.3gpp.org/tsg_ran/WG1_RL1/TSGR1_103-e/Docs/R1-2007645.zip, R1-2007645.docx [retrieved on Oct. 24, 2020] Section 3.3.

* cited by examiner

UPLINK CONFIGURED GRANTS USING MULTI-DOWNLINK CONTROL INFORMATION MESSAGING BASED FRAMEWORK

CROSS REFERENCE

The present application for patent claims the benefit of U.S. Provisional Patent Application No. 62/990,222 by KHOSHNEVISAN et al., entitled "UPLINK CONFIGURED GRANTS USING MULTI-DOWNLINK CONTROL INFORMATION MESSAGING BASED FRAMEWORK," filed Mar. 16, 2020, assigned to the assignee hereof, and expressly incorporated by reference herein.

FIELD OF TECHNOLOGY

The following relates generally to wireless communications and more specifically to uplink configured grants (ULCGs) using multi-downlink control information (multi-DCI) messaging based framework.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may support downlink and uplink communications from and to multiple transmission and reception points (TRPs). Some wireless communications systems may also support repetition of some physical channels, such as physical downlink shared channel (PDSCH) to improve reliability of downlink communications to and from multiple TRPs. As demand for communication efficiency increases, it may be desirable to provide improvements to communications from and to the multiple TRPs, among other examples.

SUMMARY

Various aspects of the described techniques relate to configuring a communication device, which may be otherwise known as user equipment (UE) to support downlink and uplink communications from and to multiple transmission and reception points (TRPs). The UE may determine multiple uplink grant configurations (also referred to as uplink configured grant (ULCG) configurations or configured grant (CG) configurations) associated with multiple uplink grant occasions (also referred to as ULCG occasions or CG occasions). The UE may be configured to associate each ULCG configuration with a value of a control resource set (CORESET) pool index. According to each ULCG configuration association with a value of a CORESET pool index, the UE may configure corresponding ULCG configurations that have different CORESET pool index values with a same set of hybrid automatic repeat request (HARQ) identifiers. The UE may use a same transport block for uplink transmissions associated with each ULCG configuration and uplink grant occasion for ULCG configurations that have a same HARQ identifier and different CORESET pool index values. Thus, multiple different uplink transmissions may use a same transport block and HARQ identifiers. The described techniques may, as a result, include features for improvements to uplink communications and, in some examples, may promote enhanced efficiency for high reliability and low latency uplink operations in 5G systems, among other benefits.

A method of wireless communication at UE is described. The method may include receiving a first uplink configured grant configuration corresponding to a first value of a CORESET pool index, receiving a second uplink configured grant configuration corresponding to a second value of the CORESET pool index different from the first value of the CORESET pool index, and transmitting a first uplink transmission during a first uplink grant occasion according to the first uplink configured grant configuration and a second uplink transmission during a second uplink grant occasion according to the second uplink configured grant configuration, where both the first uplink transmission and the second uplink transmission correspond to a same transport block and a HARQ identifier.

An apparatus for wireless communication is described. The apparatus may include a processor, memory coupled with the processor, and instructions stored in the memory. The instructions may be executable by the processor to cause the apparatus to receive a first uplink configured grant configuration corresponding to a first value of a CORESET pool index, receive a second uplink configured grant configuration corresponding to a second value of the CORESET pool index different from the first value of the CORESET pool index, and transmit a first uplink transmission during a first uplink grant occasion according to the first uplink configured grant configuration and a second uplink transmission during a second uplink grant occasion according to the second uplink configured grant configuration, where both the first uplink transmission and the second uplink transmission correspond to a same transport block and a HARQ identifier.

Another apparatus for wireless communication is described. The apparatus may include means for receiving a first uplink configured grant configuration corresponding to a first value of a CORESET pool index, receiving a second uplink configured grant configuration corresponding to a second value of the CORESET pool index different from the first value of the CORESET pool index, and transmitting a first uplink transmission during a first uplink grant occasion according to the first uplink configured grant configuration and a second uplink transmission during a second uplink grant occasion according to the second uplink configured grant configuration, where both the first uplink transmission and the second uplink transmission correspond to a same transport block and a HARQ identifier.

A non-transitory computer-readable medium storing code for wireless communication at UE is described. The code may include instructions executable by a processor to receive a first uplink configured grant configuration corresponding to a first value of a CORESET pool index, determine a second uplink configured grant configuration corresponding to a second value of the CORESET pool index different from the first value of the CORESET pool index, and transmit a first uplink transmission during a first uplink grant occasion according to the first uplink configured grant configuration and a second uplink transmission during a second uplink grant occasion according to the second uplink configured grant configuration, where both the first uplink transmission and the second uplink transmission correspond to a same transport block and a HARQ identifier.

In some examples of the method, apparatuses, and non-transitory computer-readable medium described herein, the first ULCG configuration and the second ULCG configuration may be configured with a same set of HARQ identifiers, where the set of HARQ identifiers includes the HARQ identifier associated with the first uplink grant occasion and the second uplink grant occasion.

Some examples of the method, apparatuses, and non-transitory computer-readable medium described herein may further include operations, features, means, or instructions for maintaining a timer associated with one or both of the HARQ identifier and one or more of the first value of the CORESET pool index or the second value of the CORESET pool index.

Some examples of the method, apparatuses, and non-transitory computer-readable medium described herein may further include operations, features, means, or instructions for terminating the first uplink transmission during the first uplink grant occasion based on a timer, where the timer corresponds to the HARQ identifier and the first value of the CORESET pool index.

Some examples of the method, apparatuses, and non-transitory computer-readable medium described herein may further include operations, features, means, or instructions for refraining from terminating the second uplink transmission during the second uplink grant occasion based on the timer, where the second uplink grant occasion corresponds to the HARQ identifier and the second value of the CORESET pool index.

Some examples of the method, apparatuses, and non-transitory computer-readable medium described herein may further include operations, features, means, or instructions for transmitting, based on the value of the NDI being unchanged, the second uplink transmission during the second uplink grant occasion and according to the second ULCG configuration using the same transport block.

Some examples of the method, apparatuses, and non-transitory computer-readable medium described herein may further include operations, features, means, or instructions for receiving a third ULCG configuration associated with a third uplink grant occasion and corresponding to the HARQ identifier, where the HARQ identifier may be associated with the first ULCG configuration, the second ULCG configuration, and the third ULCG configuration.

In some examples of the method, apparatuses, and non-transitory computer-readable medium described herein the third ULCG configuration may be noncorresponding to one or both of the first value and the second value of the control resource set pool index.

Some examples of the method, apparatuses, and non-transitory computer-readable medium described herein may further include operations, features, means, or instructions for associating the first value of the CORESET pool index with the third ULCG configuration based on determining that the third ULCG configuration may be noncorresponding to one or both of the first value and the second value of the CORESET pool index.

Some examples of the method, apparatuses, and non-transitory computer-readable medium described herein may further include operations, features, means, or instructions for terminating a third uplink transmission during the third uplink grant occasion based on a timer, where the timer corresponds to the HARQ identifier.

In some examples of the method, apparatuses, and non-transitory computer-readable medium described herein, the timer may be irrespective of one or both of the first value and the second value of the CORESET pool index.

Some examples of the method, apparatuses, and non-transitory computer-readable medium described herein may further include operations, features, means, or instructions for transmitting a third uplink transmission during the third uplink grant occasion based on a timer, where the timer corresponds to the HARQ identifier.

In some examples of the method, apparatuses, and non-transitory computer-readable medium described herein, the timer may be irrespective of one or both of the first value and the second value of the CORESET pool index.

Some examples of the method, apparatuses, and non-transitory computer-readable medium described herein may further include operations, features, means, or instructions for transmitting a third uplink transmission using the same transport block during the third uplink grant occasion based on the value of the NDI being unchanged.

Some examples of the method, apparatuses, and non-transitory computer-readable medium described herein may further include operations, features, means, or instructions for determining, based on one or more scheduling parameters, one or both of a first transport block size for a first transport block associated with the first uplink grant occasion and a second transport block size for a second transport block associated with the second uplink grant occasion.

In some examples of the method, apparatuses, and non-transitory computer-readable medium described herein, the first transport block size and the second transport block size may be a same transport block size, and where transmitting the first uplink transmission and the second uplink transmission using the same transport block may be based on the that the first transport block size and the second transport block size may be the same transport block size.

In some examples of the method, apparatuses, and non-transitory computer-readable medium described herein, the one or more scheduling parameters includes a modulation and coding scheme, a frequency domain resource assignment, a time domain resource assignment, a number of layers, or a combination thereof.

Some examples of the method, apparatuses, and non-transitory computer-readable medium described herein may further include operations, features, means, or instructions for receiving a downlink control information (DCI) message scheduling an uplink shared channel, where the uplink shared channel corresponds to the HARQ identifier associated with a set of HARQ identifiers and corresponds to the first ULCG configuration or the second ULCG configuration, and transmitting the uplink shared channel using the same transport block.

Some examples of the method, apparatuses, and non-transitory computer-readable medium described herein may further include operations, features, means, or instructions for determining that the scheduled uplink shared channel corresponds to the first value of the CORESET pool index or the second value of the CORESET pool index based on a CORESET pool index associated with a CORESET that the DCI message may be received.

Some examples of the method, apparatuses, and non-transitory computer-readable medium described herein may further include operations, features, means, or instructions for activating a timer associated with the first ULCG configuration or the second uplink grant configuration.

Some examples of the method, apparatuses, and non-transitory computer-readable medium described herein may further include operations, features, means, or instructions for reactivating the timer based on the received DCI message scheduling the uplink shared channel.

Some examples of the method, apparatuses, and non-transitory computer-readable medium described herein may further include operations, features, means, or instructions for reactivating the timer based on transmitting the uplink shared channel.

In some examples of the method, apparatuses, and non-transitory computer-readable medium described herein, the DCI message may be scrambled with a configured-scheduling radio network temporary identifier.

In some examples of the method, apparatuses, and non-transitory computer-readable medium described herein, the first ULCG configuration and the second ULCG configuration may be associated with a same periodicity.

Some examples of the method, apparatuses, and non-transitory computer-readable medium described herein may further include operations, features, means, or instructions for receiving, via higher layer signaling, a configuration including a first association between the first value of the CORESET pool index and the first ULCG configuration and a second association between the second value of the CORESET pool index and the second ULCG configuration.

In some examples of the method, apparatuses, and non-transitory computer-readable medium described herein, one or both of the first ULCG configuration and the second ULCG configuration correspond to a first type of ULCG configuration or a second type of uplink grant configuration.

In some examples of the method, apparatuses, and non-transitory computer-readable medium described herein, the higher layer signaling includes radio resource control signaling.

Some examples of the method, apparatuses, and non-transitory computer-readable medium described herein may further include operations, features, means, or instructions for receiving a DCI message in a CORESET, and where the received DCI message activates the first ULCG configuration or the second ULCG configuration based on a value of the control resource pool index of the CORESET associated with the received DCI message, and the value of the CORESET pool index corresponds to the first value or the second value.

A method of wireless communication at base station is described. The method may include receiving a first uplink transmission during a first uplink grant occasion according to a first ULCG configuration and a second uplink transmission during a second uplink grant occasion according to a second ULCG configuration, where the first ULCG configuration corresponds to a first value of a CORESET pool index and the second ULCG configuration corresponds to a second value of the CORESET pool index different from the first value of the CORESET pool index, and where both the first uplink transmission and the second uplink transmission correspond to a same transport block and a HARQ identifier and decoding the first uplink transmission and the second uplink transmission.

An apparatus for wireless communication is described. The apparatus may include a processor, memory coupled with the processor, and instructions stored in the memory. The instructions may be executable by the processor to cause the apparatus to receive a first uplink transmission during a first uplink grant occasion according to a first ULCG configuration and a second uplink transmission during a second uplink grant occasion according to a second ULCG configuration, where the first ULCG configuration corresponds to a first value of a CORESET pool index and the second ULCG configuration corresponds to a second value of the CORESET pool index different from the first value of the CORESET pool index, and where both the first uplink transmission and the second uplink transmission correspond to a same transport block and a HARQ identifier and decode the first uplink transmission and the second uplink transmission.

Another apparatus for wireless communication is described. The apparatus may include means for receiving a first uplink transmission during a first uplink grant occasion according to a first ULCG configuration and a second uplink transmission during a second uplink grant occasion according to a second ULCG configuration, where the first ULCG configuration corresponds to a first value of a CORESET pool index and the second ULCG configuration corresponds to a second value of the CORESET pool index different from the first value of the CORESET pool index, and where both the first uplink transmission and the second uplink transmission correspond to a same transport block and a HARQ identifier and decoding the first uplink transmission and the second uplink transmission.

A non-transitory computer-readable medium storing code for wireless communication at base station is described. The code may include instructions executable by a processor to receive a first uplink transmission during a first uplink grant occasion according to a first ULCG configuration and a second uplink transmission during a second uplink grant occasion according to a second ULCG configuration, where the first ULCG configuration corresponds to a first value of a CORESET pool index and the second ULCG configuration corresponds to a second value of the CORESET pool index different from the first value of the CORESET pool index, and where both the first uplink transmission and the second uplink transmission correspond to a same transport block and a HARQ identifier and decode the first uplink transmission and the second uplink transmission.

In some examples of the method, apparatuses, and non-transitory computer-readable medium described herein, the first ULCG configuration and the second ULCG configuration may be configured with a same set of HARQ identifiers, where the set of HARQ identifiers includes the HARQ identifier associated with the first uplink grant occasion and the second uplink grant occasion.

Some examples of the method, apparatuses, and non-transitory computer-readable medium described herein may further include operations, features, means, or instructions for transmitting a timer configuration corresponding to a timer associated with one or both of the HARQ identifier and one or more of the first value of the CORESET pool index or the second value of the CORESET pool index.

In some examples of the method, apparatuses, and non-transitory computer-readable medium described herein, the timer may be irrespective of one or both of the first value and the second value of the CORESET pool index.

Some examples of the method, apparatuses, and non-transitory computer-readable medium described herein may further include operations, features, means, or instructions for transmitting a DCI message scheduling an uplink shared channel, where the uplink shared channel corresponds to the HARQ identifier associated with a set of HARQ identifiers and corresponds to the first ULCG configuration or the second ULCG configuration, and receiving the uplink shared channel on the same transport block.

Some examples of the method, apparatuses, and non-transitory computer-readable medium described herein may further include operations, features, means, or instructions for scrambling the DCI message with a configured-scheduling radio network temporary identifier.

In some examples of the method, apparatuses, and non-transitory computer-readable medium described herein, the first ULCG configuration and the second ULCG configuration may be associated with a same periodicity.

Some examples of the method, apparatuses, and non-transitory computer-readable medium described herein may further include operations, features, means, or instructions for transmitting, via higher layer signaling, a configuration including a first association between the first value of the CORESET pool index and the first ULCG configuration and a second association between the second value of the CORESET pool index and the second ULCG configuration.

In some examples of the method, apparatuses, and non-transitory computer-readable medium described herein, one or both of the first ULCG configuration and the second ULCG configuration correspond to a first type of ULCG configuration or a second type of ULCG configuration.

In some examples of the method, apparatuses, and non-transitory computer-readable medium described herein, the higher layer signaling includes radio resource control signaling.

Some examples of the method, apparatuses, and non-transitory computer-readable medium described herein may further include operations, features, means, or instructions for transmitting a DCI message in a CORESET, and where the transmitted DCI message activates the first ULCG configuration or the second ULCG configuration based on a value of the control resource pool index of the CORESET associated with the transmitted DCI message, and the value of the CORESET pool index corresponds to the first value or the second value.

DETAILED DESCRIPTION

Figure 1:
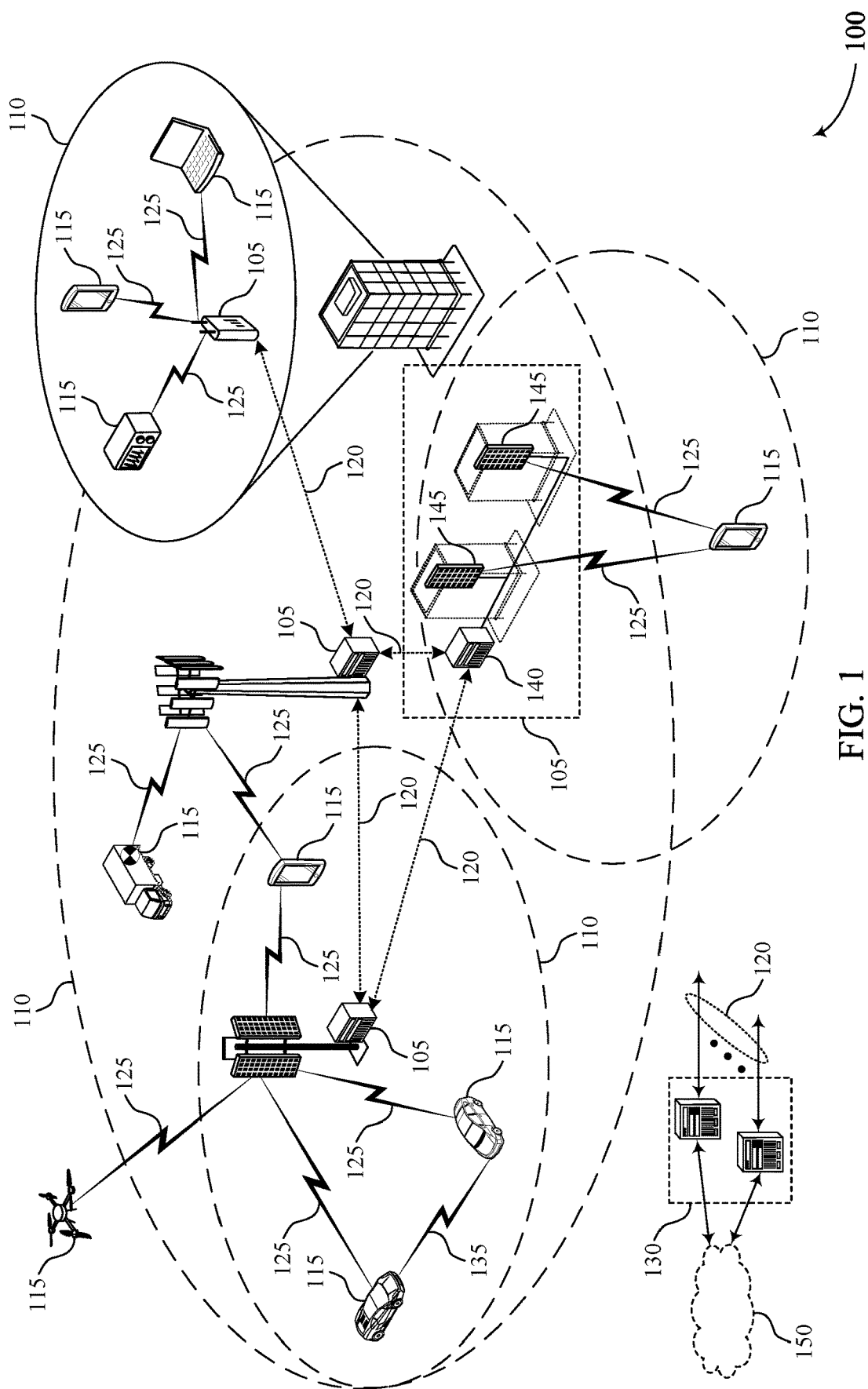
FIGS. 1 and 2 illustrate examples of wireless communications systems in accordance with aspects of the present disclosure.

Wireless communications systems may include multiple communication devices such as user equipment (UEs) and base stations, which may provide wireless communication services to the UEs. For example, such base stations may be next-generation NodeBs or giga-NodeBs (either of which may be referred to as a gNB) that may support multiple radio access technologies including fourth generation (4G) systems, such as Long Term Evolution (LTE) systems, as well as fifth generation (5G) systems, which may be referred to as New Radio (NR) systems. The described techniques may be used to configure the UEs to support communications to and from multiple transmission and reception points (TRPs). Some wireless communications systems may also support repetition of some physical channels, such as physical downlink shared channels (PDSCH), physical uplink shared channels (PUSCH) to improve reliability of downlink and uplink communications to and from multiple TRPs. As demand for communication efficiency increases, it may be desirable to provide improvements to communications from and to the multiple TRPs, among other examples The UEs may determine multiple uplink grant configurations (also referred to as uplink configured grant (ULCG) configurations or configured grant (CG) configurations) associated with multiple uplink grant occasions (also referred to as ULCG occasions or CG occasions). For example, the UEs may receive multiple ULCG configurations. The UEs may be configured to associate each ULCG configuration with a value of a control resource set (CORESET) pool index. According to each ULCG configuration association with a value of a CORESET pool index, the UE may configure corresponding ULCG configurations that have different CORESET pool index values with a same set of hybrid automatic repeat request (HARQ) identifiers. The UEs may use a same transport block for uplink transmissions associated with each ULCG configuration and uplink grant occasion for ULCG configurations that have a same HARQ identifier and different CORESET pool index values. Thus, multiple different uplink transmissions may use a same transport block and HARQ identifiers Particular aspects of the subject matter described in this disclosure may be implemented to realize one or more of the following potential improvements, among others. The techniques employed by the UE may provide benefits and enhancements to the operation of the UE. For example, operations performed by the UE may provide improvements to communications when operating in 5G systems. In some examples, configuring the UE to support ULCGs using multi-DCI framework, among other examples in 5G systems, may support improvements in power consumption, resource usage, coverage enhancements, spectral efficiency, higher data rates, among other benefits.

Aspects of the disclosure are initially described in the context of wireless communications systems. Aspects of the disclosure are further illustrated by and described with reference to apparatus diagrams, system diagrams, and flowcharts.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
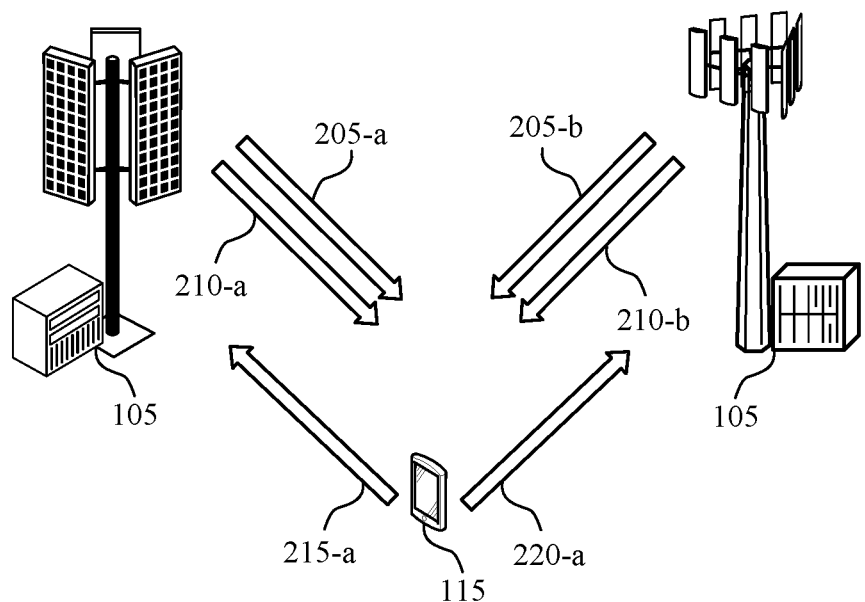

FIG. 2 illustrates an example of a wireless communications system 200 in accordance with aspects of the present disclosure. In some examples, the wireless communications system 200 may implement aspects of the wireless communications system 100. For example, the wireless communications system 200 may include multiple TRPs 105, which may be examples of the corresponding devices described with reference to FIG. 1, such as a base station 105. The wireless communications system 200 may also include a UE 115, which may be examples of the corresponding devices described with reference to FIG. 1. The wireless communications system 200 may support multiple radio access technologies including 4G systems such as LTE systems, LTE-A systems, or LTE-A Pro systems, 5G systems, which may be referred to as NR systems. The wireless communications system 200 may also support improvements in power consumption and, in some examples, may promote enhanced efficiency for high reliability and low latency directional uplink communications, among other benefits.

The TRPs 105 and the UE 115 may be configured with multiple antennas, which may be used to employ techniques such as transmit diversity, receive diversity, multiple-input multiple-output communications, or beamforming, or any combination thereof. The antennas of the TRPs 105 and the UE 115 may be located within one or more antenna arrays or antenna panels, which may support multiple-input multiple-output operations or transmit or receive beamforming. For example, the antennas or antenna arrays associated with the TRPs 105 may be co-located at an antenna assembly, such as an antenna tower. In some examples, antennas or antenna arrays associated with the TRPs 105 may be located in diverse geographic locations. The TRPs 105 may have an antenna array with a number of rows and columns of antenna ports that the TRPs 105 may use to support beamforming of directional communications with the UE 115. Likewise, the UE 115 may have one or more antenna arrays that may support various multiple-input multiple-output or beamforming operations. Additionally or alternatively, an antenna panel may support radio frequency beamforming for a signal transmitted via one or more antenna ports. The TRPs 105 and the UE 115 may thus be configured to support directional communications using the multiple antennas.

The UE 115, in the wireless communications system 200, may support operations to preserve resources (for example, time and frequency resources of the wireless communications system 200), a battery life of the UE 115, among other examples. In some examples, the UE 115 may be configured to support operations to manage or improve the directional communications between the multiple TRPs 105. For example, the wireless communications system 200 may support a multi-DCI messaging-based architecture for multiple TRP communications. In some examples, the UE 115 may be configured, via higher layer signaling, such as RRC signaling or MAC-CE signaling to support the multi-DCI messaging-based architecture for multiple TRP communications. The UE 115 may be configured via a higher layer parameter (e.g., a PDCCH-Config parameter), which may include various values for a CORESET pool index for an active bandwidth part of a serving cell. For example, the higher layer parameter may configure a value among at least two different values for a CORESET pool index for one or multiple CORESETs.

In the example of FIG. 2, a TRP 105 may transmit, to the UE 115, a DCI message on a PDCCH 205-a, where the DCI message schedules a PDSCH 210-a. Similarly, a TRP 105 may transmit, to the UE 115, a DCI message on a PDCCH 205-b, where the DCI message schedules a PDSCH 210-b. A corresponding DCI message transmitted from the TRP 105 thereby schedules a corresponding PDSCH transmitted from the TRP 105. The DCI messages may correspond to a specific DCI format. In some examples, the DCI messages may correspond to a DCI format 1-0 scheduling a PDSCH. In some other examples, the DCI messages may correspond to a DCI format 1-1 scheduling a PDSCH. In other examples, the DCI messages may correspond to a DCI format 1-2 scheduling a PDSCH.

The UE 115 may be configured to differentiate between the multiple TRPs 105 based in part on a value of a CORESET pool index, which may correspond to a CORESET in which a corresponding DCI message is received. For example, the UE 115 may receive, from each TRP 105, a corresponding PDCCH 205 carrying a corresponding DCI message in a control region for the corresponding PDCCH 205. The control region (e.g., a CORESET) for a PDCCH 205 may be defined over one or both of a number of time domain resources (e.g., symbol periods, minislots, or slots) and a number of frequency domain resources (e.g., subcarriers, carriers). The UE 115 may be configured with a maximum number of CORESESTs, for example, such as five CORESETs. Each CORESET may be configured with a value of a CORESET pool index. The value of the CORESET pool index may be numerical value, such as zero ("0") or one ("1"). Each CORESET may be configured to a group based in part on a value of a COREST pool index of each corresponding CORESET. Examples of CORESET pool indices is described in more detail with reference to FIG. 3.

Figure 3:
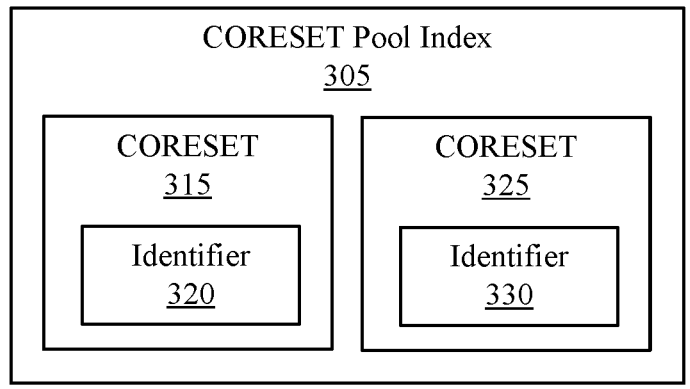
FIG. 3 illustrates an example of CORESET pool indices in accordance with aspects of the present disclosure.
Figure 3:
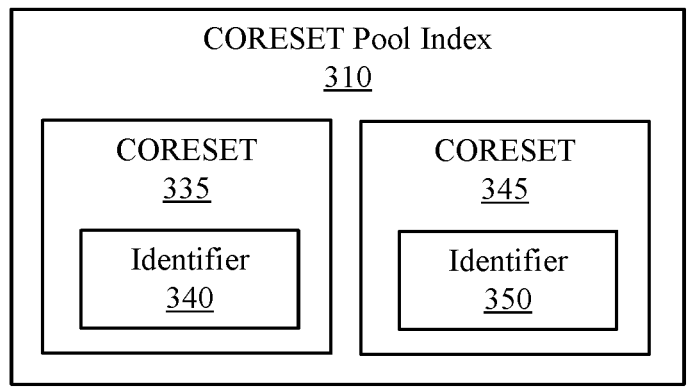

FIG. 3 illustrates an example of CORESET pool indices 300 in accordance with aspects of the present disclosure. The CORESET pool indices 300 may implement aspects of the wireless communications systems 100 and 200 described with reference to FIGS. 1 and 2, respectively. For example, the CORESET pool indices 300 may be based on a configuration by a base station 105, and implemented by a UE 115, which may be examples of the corresponding devices described with reference to FIGS. 1 and 2. In the example of FIG. 3, two or more CORESETs may be grouped into at least two CORESET groups.

Each CORESET may be configured with a value of a CORESET pool index. The value of the CORESET pool index may have a numerical value, such as a binary value of 0 or 1. The CORESET pool indices 300 may include a CORESET pool index 305, which may be configured to have a binary value of 0 (e.g., CORESET pool index=0). The CORESET pool indices 300 may include a CORESET pool index 310, which may be configured to have a binary value of 1 (e.g., CORESET pool index=1). Each CORESET may relate (e.g., be assigned) to a group (e.g., the CORESET pool index 305 or the CORESET pool index 310) based in part on a value of a CORESET pool index of each corresponding CORESET.

In some examples, the CORESET pool index 305 may be associated with a CORESET 315 that may be associated with an identifier 320 (e.g., CORESET ID=1), as well as may be associated with a CORESET 325 that may be associated with an identifier 330 (e.g., CORESET ID=2). Each value of a CORESET pool index associated with the CORESET 315 and the CORESET 325 may be a same value (e.g., CORESET pool index=0). In some examples, the CORESET pool index 310 may be associated with a CORESET 335 that may be associated with an identifier 340 (e.g., CORESET ID=3), as well as may be associated with a CORESET 345 that may be associated with an identifier 350 (e.g., CORESET ID=4). Each value of a CORESET pool index associated with the CORESET 335 and the CORESET 345 may be a same value (e.g., CORESET pool index=1). Thus, CORESETs corresponding to a same value of a CORESET pool index may be grouped.

Returning to FIG. 2, in some examples, the UE 115 may be configured to provide HARQ information for scheduled physical downlink channels (e.g., PDSCH), in 5G systems. The UE 115 may be configured, in some examples, to generate a HARQ codebook (e.g., a HARQ-ACK codebook) for providing HARQ information for scheduled physical downlink channels. In some examples, the UE 115 may be configured to generate the HARQ codebook based in part on a value of a CORESET pool index related to a CORESET in which a DCI message is received. In some examples, the UE 115 may be configured to determine a scrambling for scheduled physical downlink and uplink channels based in part on a value of a CORESET pool index related to a CORESET in which a DCI message is received. The UE 115 may, in some examples, be configured to determine a rate matching for scheduled physical downlink and uplink channels based in part on a value of a CORESET pool index related to a CORESET in which a DCI message is received.

The UE 115 may, in some examples, receive an ULCG (ULCG). For example, the UE 115 may receive the ULCG from a TRP 105. A ULCG may be one of at least two types of ULCGs. For a first type of ULCG, various information associated with the ULCG may be configured via RRC signaling, such as an RRC configuration message. For a second type of ULCG, various information associated with the ULCG may be activated via downlink control signaling, such as a DCI message. For example, a periodicity, an offset, or the like may be RRC configured, while other information may be indicated in a DCI message that activates an ULCG for an uplink transmission (e.g., a PUSCH transmission). The DCI message may thereby activate the ULCG and until a subsequent DCI message releases the ULCG, the UE 115 may transmit the uplink transmission (e.g., the PUSCH transmission) according to the periodicity, the offset, or the like.

The UE 115 may be also configured to differentiate various DCI messages received from various multiple TRPs 105 based in part on a network identifier associated with each TRP 105 of the multiple TRPs 105. In some examples, a cyclic redundancy check (CRC) of a DCI message may be scrambled with a configured-scheduling radio network temporary identifier (CS-RNTI). For example, a TRP 105 may scramble a CRC of a DCI message with CS-RNTI associated with the TRP 105. In addition, the TRP 105 may assign a bit value to a new data indicator (NDI) field (e.g., NDI=0) (or toggle the NDI) of the DCI message. The UE 115 may determine whether the DCI message activates an ULCG or releases the ULCG based in part on the scrambled DCI message (e.g., the scrambled CRC of the DCI message with the CS-RNTI) or a value of an NDI field in the DCI message, or both.

A TRP 105 of the multiple TRPs 105 may, in some examples, use a DCI message to schedule a retransmission of an uplink transmission (e.g., a PUSCH transmission) for the UE 115. In some examples, a TRP 105 of the multiple TRPs 105 may use a DCI message to schedule a retransmission of an uplink transmission (e.g., a PUSCH transmission), which was initially scheduled by an ULCG. For example, a TRP 105 may scramble a CRC of a DCI message with a CS-RNTI associated with the TRP 105. In addition, the TRP 105 may assign a different bit value to an NDI field (e.g., NDI=1) (or not toggle the NDI) of the DCI message. In some examples, a MAC layer associated with the UE 115 may toggle or not to toggle the NDI. In some examples, for ULCG, NDI=1 means retransmission (hence from the MAC layer perspective, it means NDI is assumed to be not toggled). The NDI field may thus inform the UE 115 whether the UE is to transmit a new uplink transmission or retransmit an uplink transmission.

In some examples, a DCI message may include a HARQ identifier field. However, a value of the HARQ identifier field may not be used to determine a HARQ identifier. For example, it is used for validation purpose (it may be set to all 0's), or it is used to indicate which ULCG configuration is activated. Above is the case when activation/release (NDI=0) and not for retransmission grant (NDI=1). As such, the HARQ identifier field may not be used for an initial uplink transmission (e.g., an initial PUSCH transmission) associated with an ULCG. For example, a DCI message may be absent of a HARQ identifier for an initial transmission for both a first type of ULCG and a second type of ULCG. A HARQ identifier thus is not indicated in the DCI message. In some examples, the UE 115 may determine a HARQ identifier associated with an ULCG configuration and an ULCG occasion based in part on a timing with a modulo operation of a number of HARQ processes configured for the ULCG configuration. The UE 115 may identify the number of HARQ processes based in part on an RRC configured parameter (e.g., nrofHARQ-Processes). In some examples, the UE 115 may be configured to support multiple ULCG configurations. The set of HARQ identifiers associated with each ULCG configuration may be separated by an offset value to ensure that the HARQ identifier are nonoverlapping.

Figure 4:
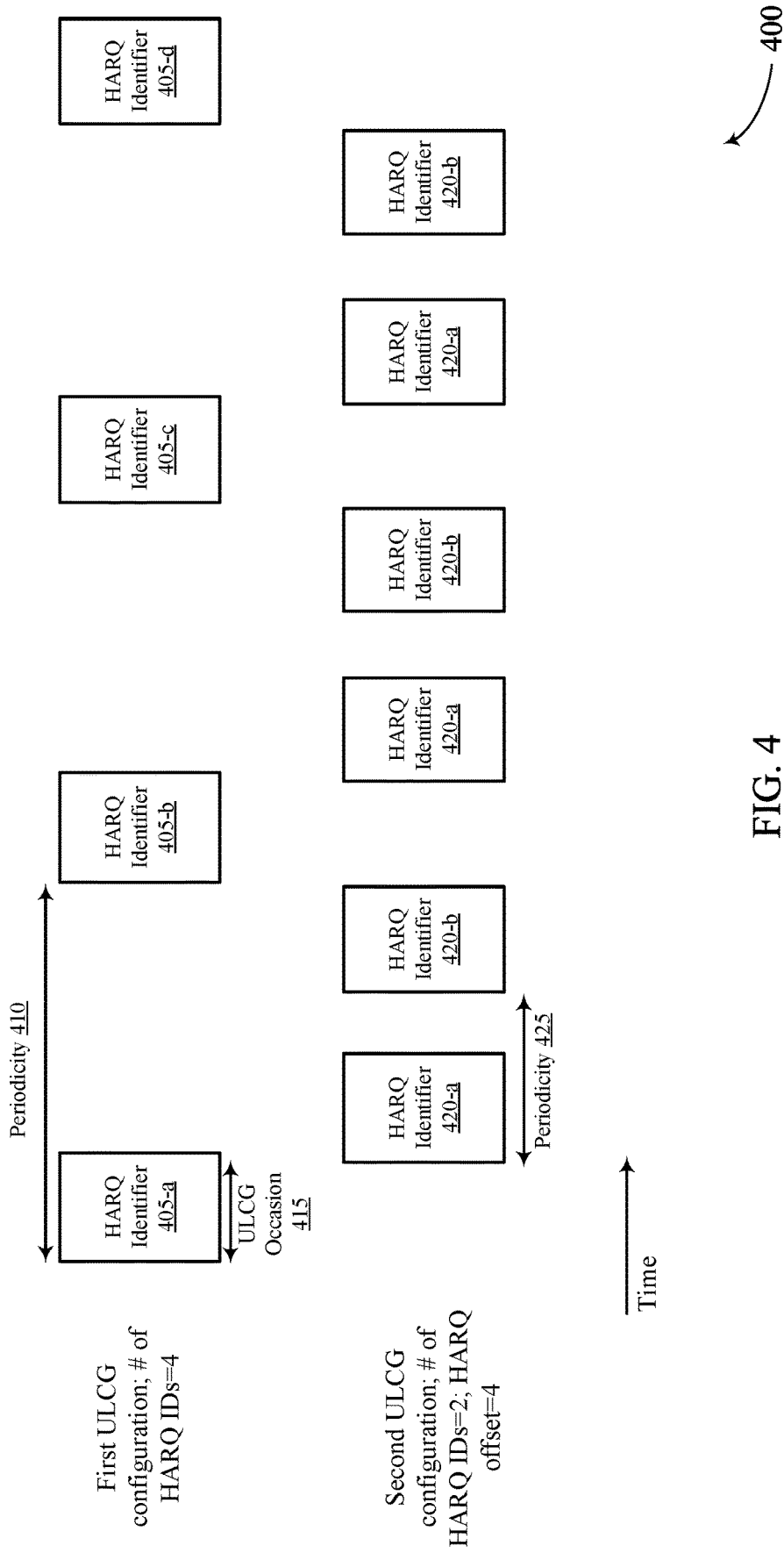
FIGS. 4 through 10 illustrate examples of timelines in accordance with aspects of the present disclosure.

FIG. 4 illustrates an example of a timeline 400 in accordance with aspects of the present disclosure. The timeline 400 may implement aspects of the wireless communications systems 100 and 200 described with reference to FIGS. 1 and 2, respectively. For example, the timeline 400 may be based on a configuration by a base station 105, and implemented by a UE 115, which may be examples of the corresponding devices described with reference to FIGS. 1 and 2. The timeline 400 may support multiple radio access technologies including 4G systems such as LTE systems, LTE-A systems, or LTE-A Pro systems, 5G systems, which may be referred to as NR systems.

A UE 115 may be configured with one or more ULCG configurations. For example, the UE 115 may be configured with one or more ULCG configurations based on receiving the one or more ULCG configurations. In the example of FIG. 4, the UE 115 may be configured with at least two ULCG configurations. Each ULCG configuration may be associated with one or more HARQ identifiers. In the example of FIG. 4, the UE 115 may be configured with a first ULCG configuration that may be associated with one or more HARQ identifiers. For example, the UE 115 may be configured with four HARQ identifiers 405 (e.g., HARQ identifiers=4) for the first ULCG configuration. In the example of FIG. 4, the first ULCG configuration may also correspond to a periodicity 410 and an ULCG occasion 415. The UE 115 may transmit an uplink transmission (e.g., a PUSCH transmission) according to the periodicity 410. In some examples, the UE 115 may transmit the uplink transmission (e.g., the PUSCH transmission) during the ULCG occasion 415 and according to the first ULCG configuration.

In the example of FIG. 4, the UE 115 may be configured with a second ULCG configuration that may be associated with one or more HARQ identifiers. For example, the UE 115 may be configured with two HARQ identifiers 420 (e.g., HARQ identifiers=2) for the second ULCG configuration. The second ULCG configuration may also correspond to a periodicity 425. The UE 115 may transmit an uplink transmission (e.g., a PUSCH transmission) according to the periodicity 425. In some examples, the UE 115 may transmit the uplink transmission (e.g., the PUSCH transmission) according to the second ULCG configuration. In the example of FIG. 4, the HARQ identifiers 405 associated with the first ULCG configuration and the HARQ identifiers 420 associated with the second ULCG configuration may be separated by an offset value to prevent an overlap. For example, a HARQ identifier 405-*a*, a HARQ identifier 405-*b*, a HARQ identifier 405-*c*, and a HARQ identifier 405-*d* may each be separated by an offset value from a HARQ identifier 420-*a* and a HARQ identifier 420-*b*. Each HARQ identifier associated with each ULCG configuration may therefore be separated by an offset value to ensure that the HARQ identifier are nonoverlapping.

Returning to FIG. 2, the UE 115 may, in some examples, be configured with a timer for each HARQ identifier configured for an ULCG. In other words, for a HARQ identifier configured for an ULCG, a timer per HARQ identifier may be maintained by the UE 115. The UE 115 may receive a timer configuration associated with each HARQ identifier configured for an ULCG via RRC configuration, or the like. When an ULCG occasion associated with a given HARQ identifier is transmitted, the timer associated with that HARQ identifier is started/restarted.

Figure 5:
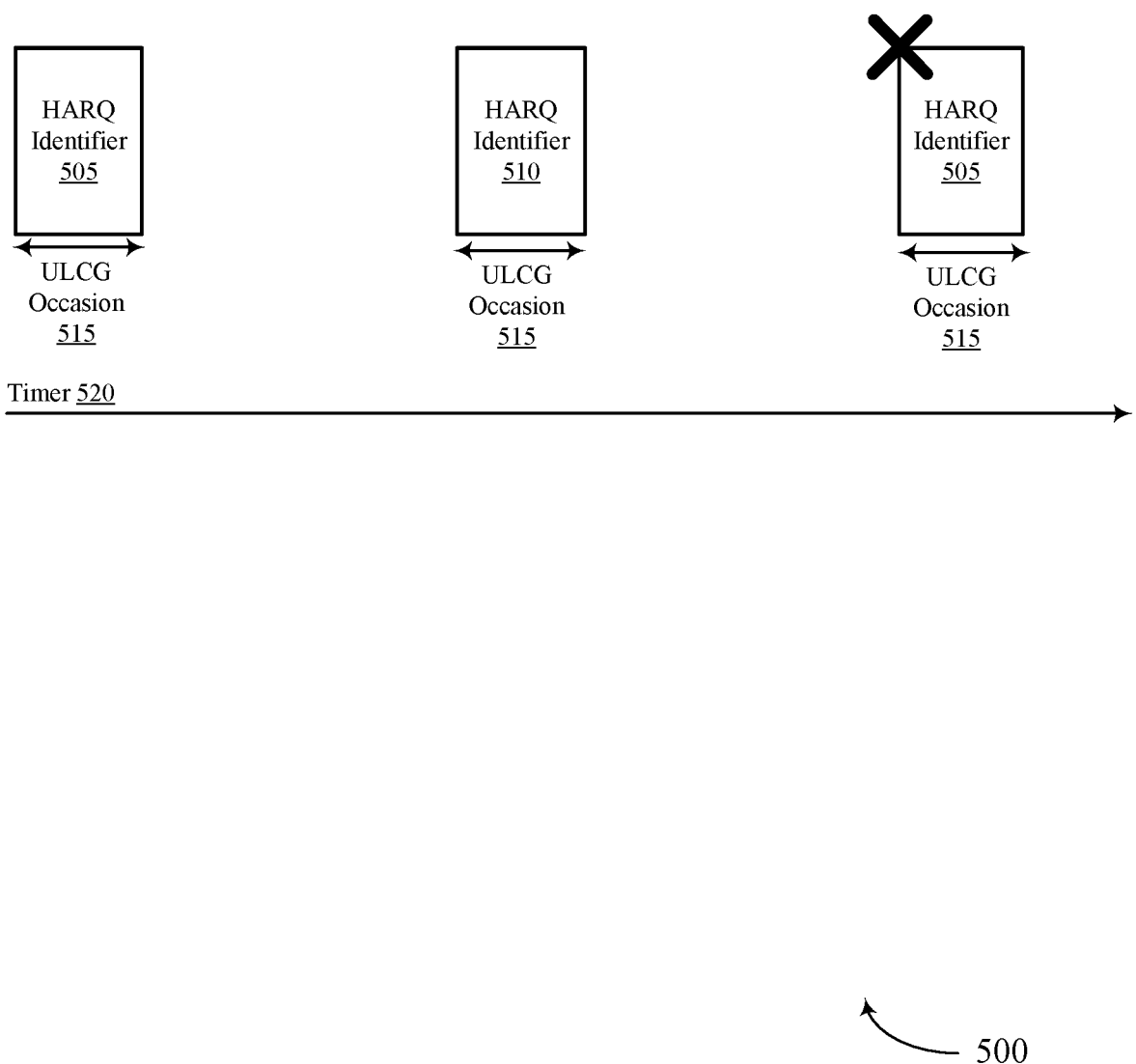

FIG. 5 illustrates an example of a timeline 500 in accordance with aspects of the present disclosure. The timeline 500 may implement aspects of the wireless communications systems 100 and 200 described with reference to FIGS. 1 and 2, respectively. For example, the timeline 500 may be based on a configuration by a base station 105, and implemented by a UE 115, which may be examples of the corresponding devices described with reference to FIGS. 1 and 2. The timeline 500 may support multiple radio access technologies including 4G systems such as LTE systems, LTE-A systems, or LTE-A Pro systems, 5G systems, which may be referred to as NR systems.

The timeline 500 may correspond to a number of HARQ identifiers. For example, the timeline 500 may be associated with a HARQ identifier 505 and a HARQ identifier 510. Each HARQ identifier may correspond to an ULCG occasion 515. In some examples, the UE 115 may be configured to activate or reactivate a timer associated with one of the HARQ identifiers, such as the HARQ identifier 505 or the HARQ identifier 510. As described herein activating a timer may involve both start/restart of the timer. That is, if a timer is already running, restarting means that the timer starts counting again. Otherwise, if a timer is not running, when timer is started, it means that timer is activated and the timer starts counting. In some examples, a length of the timer may be configured via RRC configuration. The length of the timer may be a factor of a ULCG periodicity (e.g., 1 to 64 of a ULCG periodicity).

In the example of FIG. 5, the UE 115 may activate a timer 520 that may be associated with the HARQ identifier 505. In some examples, the UE 115 may be configured to refrain from transmitting uplink transmissions (e.g., PUSCH transmissions) associated with a HARQ identifier of a running timer. In other words, if a timer for a HARQ identifier is running, transmission of an ULCG occasion with that HARQ identifier is canceled. For example, the UE 115 may be configured to refrain from transmitting uplink transmissions (e.g., PUSCH transmissions) associated with the HARQ identifier 505 while the timer 520 is active (e.g., running).

Returning to FIG. 2, the UE 115 may, in some examples, be configured to activate or reactivate (e.g., start or restart) a timer for each HARQ identifier configured for an ULCG by both an ULCG or a dynamic grant (e.g., for both an initial uplink transmission and an uplink re-transmission).

Figure 6:
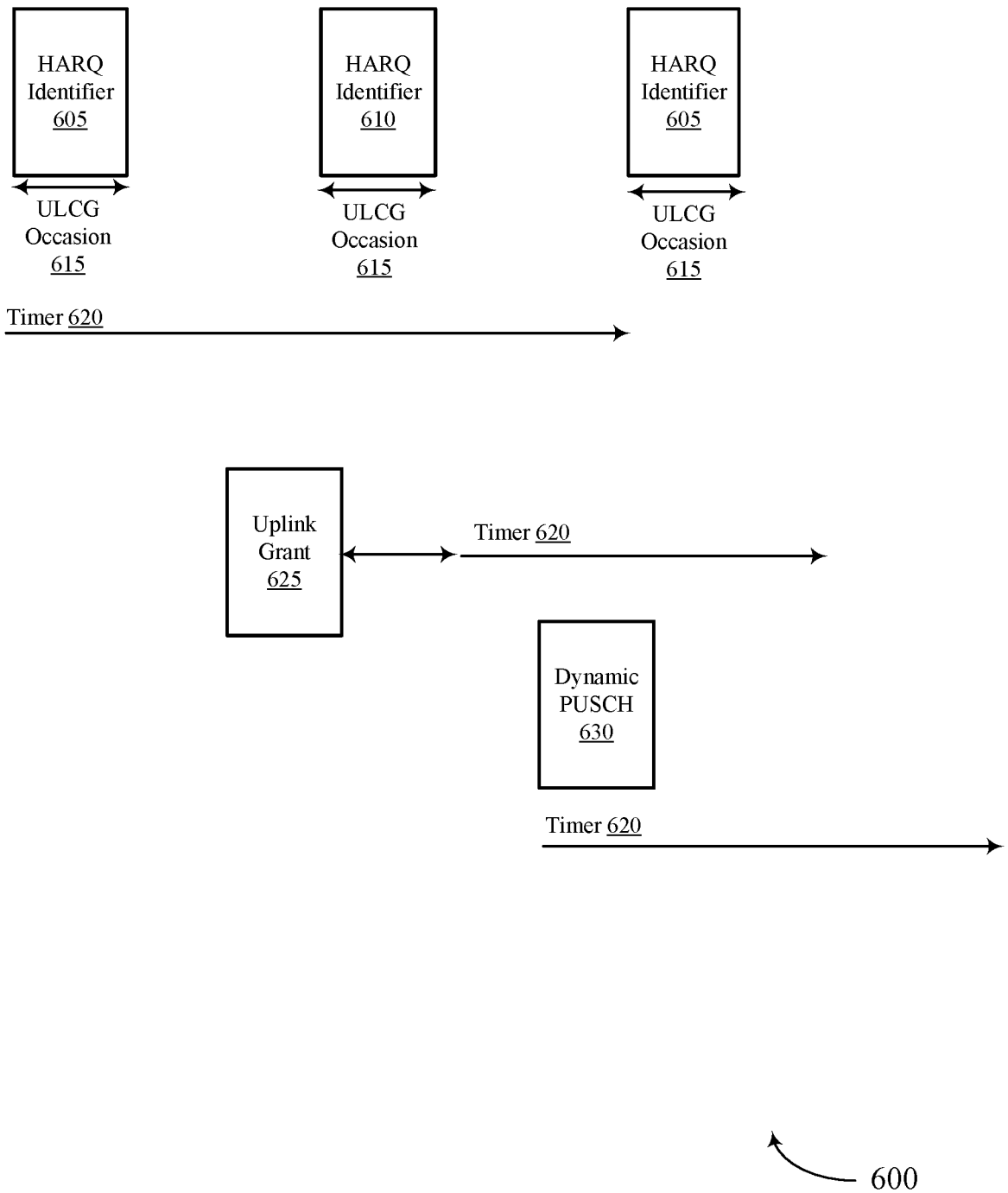

FIG. 6 illustrates an example of a timeline 600 in accordance with aspects of the present disclosure. The timeline 600 may implement aspects of the wireless communications systems 100 and 200 described with reference to FIGS. 1 and 2, respectively. For example, the timeline 600 may be based on a configuration by a base station 105, and implemented by a UE 115, which may be examples of the corresponding devices described with reference to FIGS. 1 and 2. The timeline 600 may support multiple radio access technologies including 4G systems such as LTE systems, LTE-A systems, or LTE-A Pro systems, 5G systems, which may be referred to as NR systems.

The timeline 600 may correspond to a HARQ identifier. For example, the timeline 600 may be associated with a HARQ identifier 605 or a HARQ identifier 610, which may correspond to an ULCG occasion 615. In some examples, the UE 115 may be configured to activate or reactivate a timer associated with the HARQ identifier 605. In the example of FIG. 6, the UE 115 may activate a timer 620 associated with the HARQ identifier 605. In some examples, the timer 620 may be activated (e.g., started) or reactivated (e.g., restarted) by one or both an ULCG and a dynamic grant.

The dynamic grant may be scrambled based in part on a cell-RNTI (C-RNTI) or CS-RNTI. For an ULCG, the timer 620 may be activated or reactivated based in part on an uplink transmission (e.g., when a PUSCH transmission is performed). For a dynamic grant, the UE 115 may activate or reactivate the timer 620 multiple times. For example, the UE 115 may receive a dynamic uplink grant 625 (e.g., via a DCI message) and reactivate the timer 620 based in part on the dynamic uplink grant 625. In other words, the UE 115 may be configured to reactivate the timer 620 based in part on reception of the dynamic uplink grant 625. The dynamic uplink grant 625 may schedule a dynamic PUSCH 630, which may be associated with the HARQ identifier 605. The UE 115 may be configured to reactivate the timer 620 as part of (or prior to) the uplink transmission on the dynamic PUSCH 630 (e.g., when a PUSCH transmission is performed).

Returning to FIG. 2, the UE 115 may be configured to support repetition of an uplink shared data channel, for example, such as a PUSCH. In other words, the UE 115 may be configured to support PUSCH repetition. In some examples, the UE 115 may be configured to use (e.g., transmit) a same transport block for multiple PUSCH repetition to different TRPs 105 according to a multi-DCI framework. To support transmitting a same transport block for multiple PUSCH repetition to different TRPs 105, the UE 115 may be configured to support repeating a same transport block over different ULCG occasion belonging to different ULCG configurations.

The UE 115 may be configured to support repeating a same transport block one or more different ULCG occasions belonging to different ULCG configurations rather than different ULCG occasions belonging to a same ULCG configuration because for both type one ULCG and type two ULCG, one or more uplink parameters for different ULCG occasions of the same ULCG configuration may be the same. In the case of different PUSCH repetitions targeted toward different TRPs 105, these one or more uplink parameter may have to be controlled separately by the UE 115. Thus, the UE 115 may use different ULCG configurations. Examples of uplink parameters may include, but is not limited to, a sounding reference signaling indicator (SRI), a transmitted precoding matrix index (TMPI), a modulation and coding scheme (MCS), Therefore, to support the above, as well as dynamic grant PUSCH, whether retransmission of a ULCG-PUSCH scheduled by a DCI message with a corresponding CRC scrambled with CS-RNTI, or a dynamic PUSCH scheduled by a DCI message with a corresponding CRC scrambled with a C-RNTI), the UE 115 may be configured to manage a timer behavior, ULCG cancelation based on the timer behavior, and NDI toggling as described herein.

The UE 115 may be, in some examples, configured to decode (e.g., interpret) values of one or more fields in a DCI message based in part on a value of a CORESET pool index of a CORESET in which a DCI message is received. In some examples, the UE 115 may be configured to support transmitting multiple physical uplink channels, such as multiple PUSCH to improve reliability of uplink communications in the wireless communications system 200. For example, the UE 115 may be configured to transmit multiple PUSCH (e.g., at least two PUSCHs) scheduled by multiple DCI messages (e.g., at least two DCI messages). The multiple DCI messages may correspond to different CORESETs with different values of CORESET pool indices. The multiple PUSCH may, in some examples, correspond to using a same transport block. Thus, in some examples, the UE 115 may be configured to transmit multiple PUSCH that are scheduled by multiple DCI messages received in different CORESETs with different values of CORESET pool indices using a same transport block.

An ULCG configuration may be associated with a value of a CORESET pool index. For example, one ULCG configuration may be associated with a CORESET pool index value zero (e.g., CORESETPoolIndex=0) and another ULCG configuration may be associated with a CORESET pool index value one (e.g., CORESETPoolIndex=1). In case of multiple ULCG configurations, for example, such as at least two ULCG configurations associated with the different CORESET pool index values, both of the two ULCG configurations may be associated with a same set of HARQ identifiers. In some examples, the UE 115 may be configured (e.g., via an RRC configuration message) to associate each ULCG configuration of the at least two ULCG configurations with a CORESET pool index value. Alternatively, the UE 115 may be configured to associate each ULCG configuration of the at least two ULCG configurations with a CORESET pool index value, based on a DCI message that activates an ULCG configuration of the at least two ULCG configurations (i.e., based on a CORESET pool index value of a CORESET in which the DCI message is received). In some examples, a periodicity for the two ULCG configurations may be the same. As such, the UE 115 may transmit the same transport block in both an ULCG occasion for a first ULCG configuration and an ULCG occasion for a second ULCG configuration.

Figure 7:
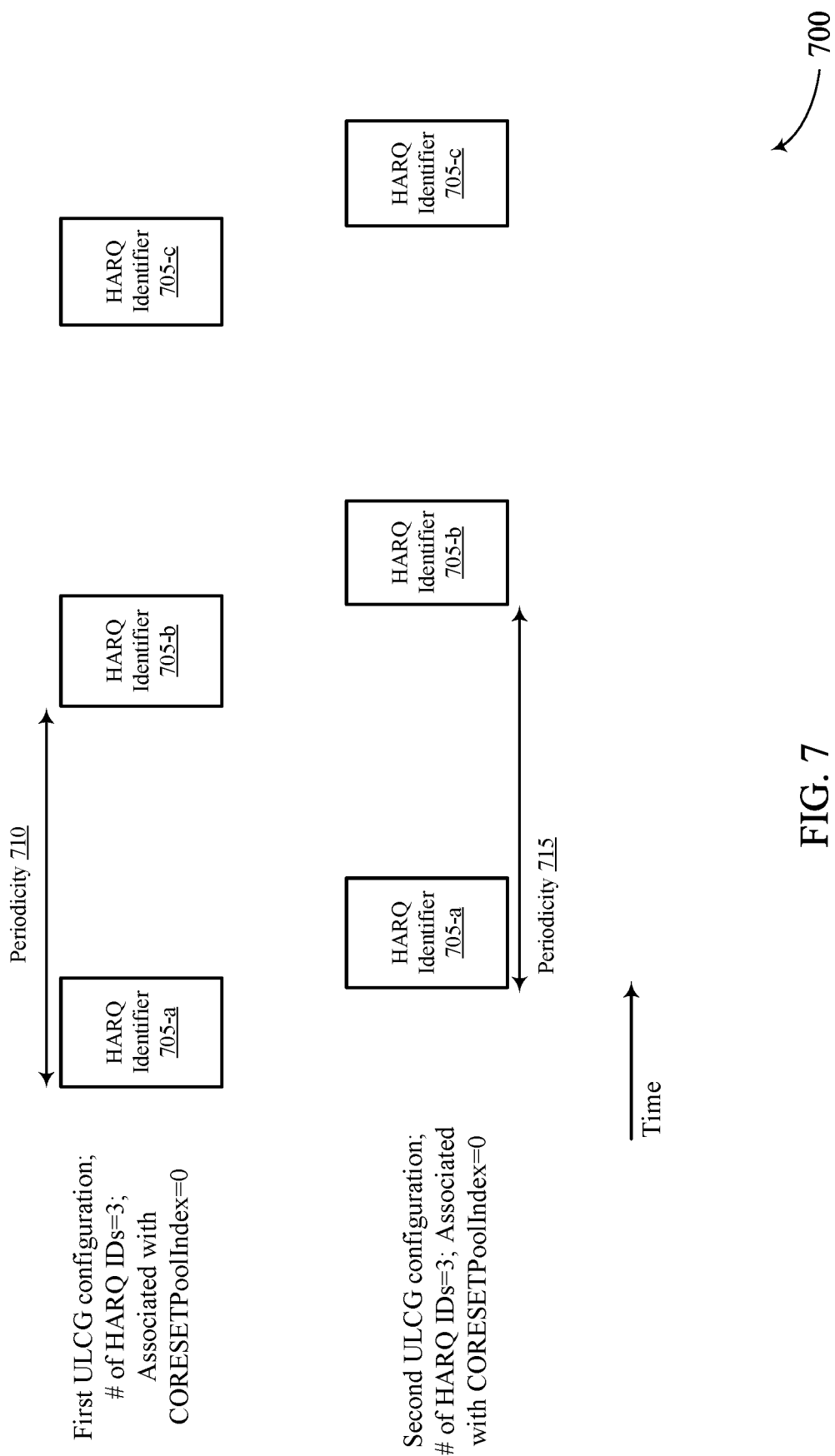

FIG. 7 illustrates an example of a timeline 700 in accordance with aspects of the present disclosure. The timeline 700 may implement aspects of the wireless communications systems 100 and 200 described with reference to FIGS. 1 and 2, respectively. For example, the timeline 700 may be based on a configuration by a base station 105, and implemented by a UE 115, which may be examples of the corresponding devices described with reference to FIGS. 1 and 2. The timeline 700 may support multiple radio access technologies including 4G systems such as LTE systems, LTE-A systems, or LTE-A Pro systems, 5G systems, which may be referred to as NR systems.

A UE 115 may be configured with one or more ULCG configurations. For example, the UE 115 may receive a first ULCG configuration and a second ULCG configuration. In the example of FIG. 7, the UE 115 may be configured with at least two ULCG configurations. Each ULCG configuration may be associated with one or more HARQ identifiers. In the example of FIG. 7, the UE 115 may be configured with a first ULCG configuration that may be associated with one or more HARQ identifiers. For example, the UE 115 may be configured with three HARQ identifiers 705 (e.g., HARQ identifiers=3) for the first ULCG configuration. In the example of FIG. 7, the first ULCG configuration may also correspond to a periodicity 710. The UE 115 may transmit multiple uplink transmissions (e.g., multiple PUSCH transmissions) according to the periodicity 710. In some examples, the UE 115 may transmit the multiple uplink transmissions (e.g., the multiple PUSCH transmissions) during one or more ULCG occasion and according to the first ULCG configuration.

In the example of FIG. 7, the UE 115 may be configured with a second ULCG configuration that may be associated with one or more HARQ identifiers. For example, the UE 115 may be configured with three HARQ identifiers 720 (e.g., HARQ identifiers=3) for the second ULCG configuration. In some examples, the first ULCG configuration and the second ULCG configuration may have the same HARQ identifiers. The second ULCG configuration may also correspond to a periodicity 715. The UE 115 may transmit multiple uplink transmissions (e.g., multiple PUSCH transmissions) according to the periodicity 715. In some examples, the UE 115 may transmit the multiple uplink transmissions (e.g., the multiple PUSCH transmissions) according to the second ULCG configuration.

In the example of FIG. 7, the HARQ identifiers 705 associated with the first ULCG configuration and the second ULCG configuration may not be separated by an offset value (e.g., offset=0). For example, a HARQ identifier 705-a, a HARQ identifier 705-b, a HARQ identifier 705-c associated with the first ULCG configuration are the same as a HARQ identifier 705-a, a HARQ identifier 705-b, a HARQ identifier 705-c associated with the second ULCG configuration.

Returning to FIG. 2, in some examples, the UE 115 may be configured to maintain a timer for a value of a COREST pool index for each HARQ identifier based in part on that an ULCG configuration is associated with the value of the COREST pool index. In some examples, the UE 115 may be configured to terminate (e.g., cancel) an uplink transmission for an ULCG occasion based in part on an active timer associated with the HARQ identifier and a CORESET pool index value associated with an ULCG configuration for the uplink transmission. In other words, an uplink transmission of an ULCG occasion with a HARQ identifier is canceled when a timer for that HARQ identifier and that CORESET pool index value is running. In some other examples, the UE 115 may be configured to refrain from terminating (e.g., cancelling) another uplink transmission for another ULCG occasion based in part on the active timer when a CORESET pool index value associated with the other uplink transmission is different from a CORESET pool index value associated with the timer. In other words, an uplink transmission of a ULCG occasion with a HARQ identifier is not canceled when a timer for that HARQ identifier and another CORESET pool index value (other than the one associated with the ULCG occasion) is running.

Figure 8:
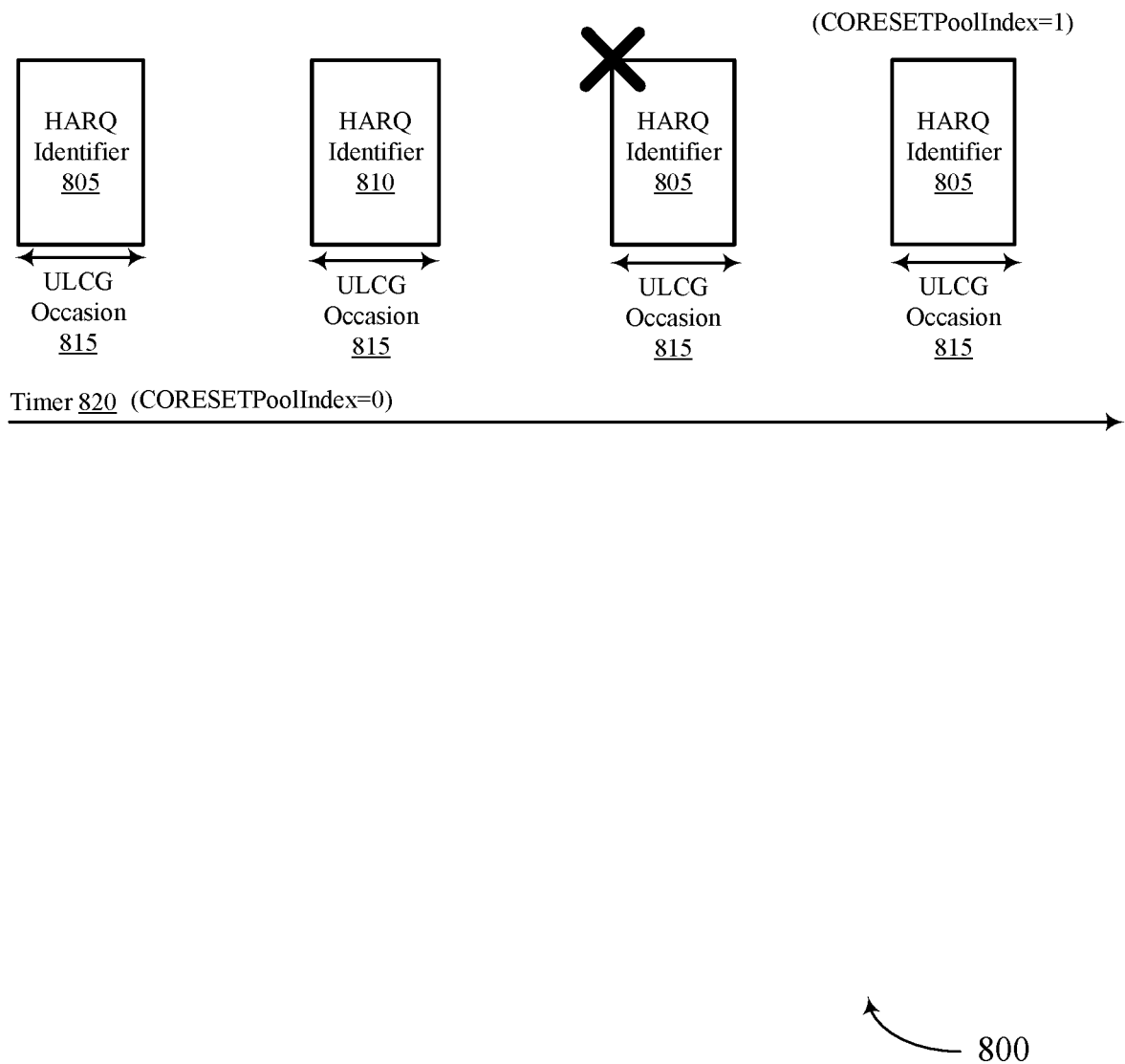

FIG. 8 illustrates an example of a timeline 800 in accordance with aspects of the present disclosure. The timeline 800 may implement aspects of the wireless communications systems 100 and 200 described with reference to FIGS. 1 and 2, respectively. For example, the timeline 800 may be based on a configuration by a base station 105, and implemented by a UE 115, which may be examples of the corresponding devices described with reference to FIGS. 1 and 2. The timeline 800 may support multiple radio access technologies including 4G systems such as LTE systems, LTE-A systems, or LTE-A Pro systems, 5G systems, which may be referred to as NR systems.

The timeline 800 may correspond to a number of HARQ identifiers. For example, the timeline 800 may be associated with a HARQ identifier 805 and a HARQ identifier 810. Each HARQ identifier may correspond to an ULCG occasion 815. In some examples, the UE 115 may be configured to activate or reactivate a timer associated with one of the HARQ identifiers, such as the HARQ identifier 805 or the HARQ identifier 810. In some examples, a length of the timer may be configured via RRC configuration. The length of the timer may be a factor of a ULCG periodicity (e.g., 1 to 64 of a ULCG periodicity).

In the example of FIG. 8, the UE 115 may activate a timer 820 that may be associated with the HARQ identifier 805. In some examples, the UE 115 may be configured to refrain from transmitting an uplink transmissions (e.g., a PUSCH transmission) associated with a HARQ identifier of a running timer. In other words, if a timer for a HARQ identifier is running, transmission of a ULCG occasion with that HARQ identifier is canceled. For example, the UE 115 may be configured to refrain from transmitting an uplink transmission (e.g., a PUSCH transmission) associated with the HARQ identifier 805 while the timer 820 is active (e.g., running) when the CORESET pool index value associated with the ULCG configuration that the ULCG occasion is the same as the CORESET pool index value associated with the timer.

The timer 820 may correspond to a first value of a COREST pool index (e.g., CORESETPoolIndex=0). In some examples, the UE 115 may be configured to transmit another uplink transmission (e.g., another PUSCH transmissions) associated with the HARQ identifier 805 while the timer 820 is active (e.g., running) if the other uplink transmission is associated with a second value of the COREST pool index (e.g., CORESETPoolIndex=1) different from the first value of a COREST pool index (e.g., CORESETPoolIndex=0). The UE 115 may be configured to transmit the other uplink transmission using a same transport block (e.g., the same transport block as a last transport block for that HARQ identifier).

In some examples, the UE 115 may identify (e.g., presume) that an NDI value is not toggled (e.g., the NDI value is unchanged). Alternatively, in some cases, for each ULCG occasion (e.g., an initial uplink transmission of a ULCG), the UE 115 may identify (e.g., presume) that an NDI value is toggled (e.g., changed) and a thereby transmit the uplink transmission on a new transport block. The UE 115 may be configured to operate as described herein (e.g., when the NDI is not toggled and the UE 115 uses a same transport block), if the timer for that HARQ identifier (but for the other CORESET pool index value) is still running. In some examples, the UE 115 may be configured to operate as described herein (e.g., when the NDI is not toggled and the UE 115 uses a same transport block), based in part on when a transport block size determination results in a same transport block size. In some examples, the UE 115 may determine the transport block size based in part on a configuration or one or more scheduling parameters (e.g., an MCS, a frequency domain resource assignment (FDRA), a time domain resource assignment (TDRA), a number of layers, etc.).

Returning to FIG. 2, similarly, for a dynamic grant when a DCI message schedules an uplink transmission (e.g., a PUSCH) with a given HARQ identifier that belongs to a set of HARQ identifiers configured with an ULCG configuration, and if the ULCG configuration is associated with a value of CORESETPoolIndex the UE 115 may manage a timer accordingly.

Figure 9:
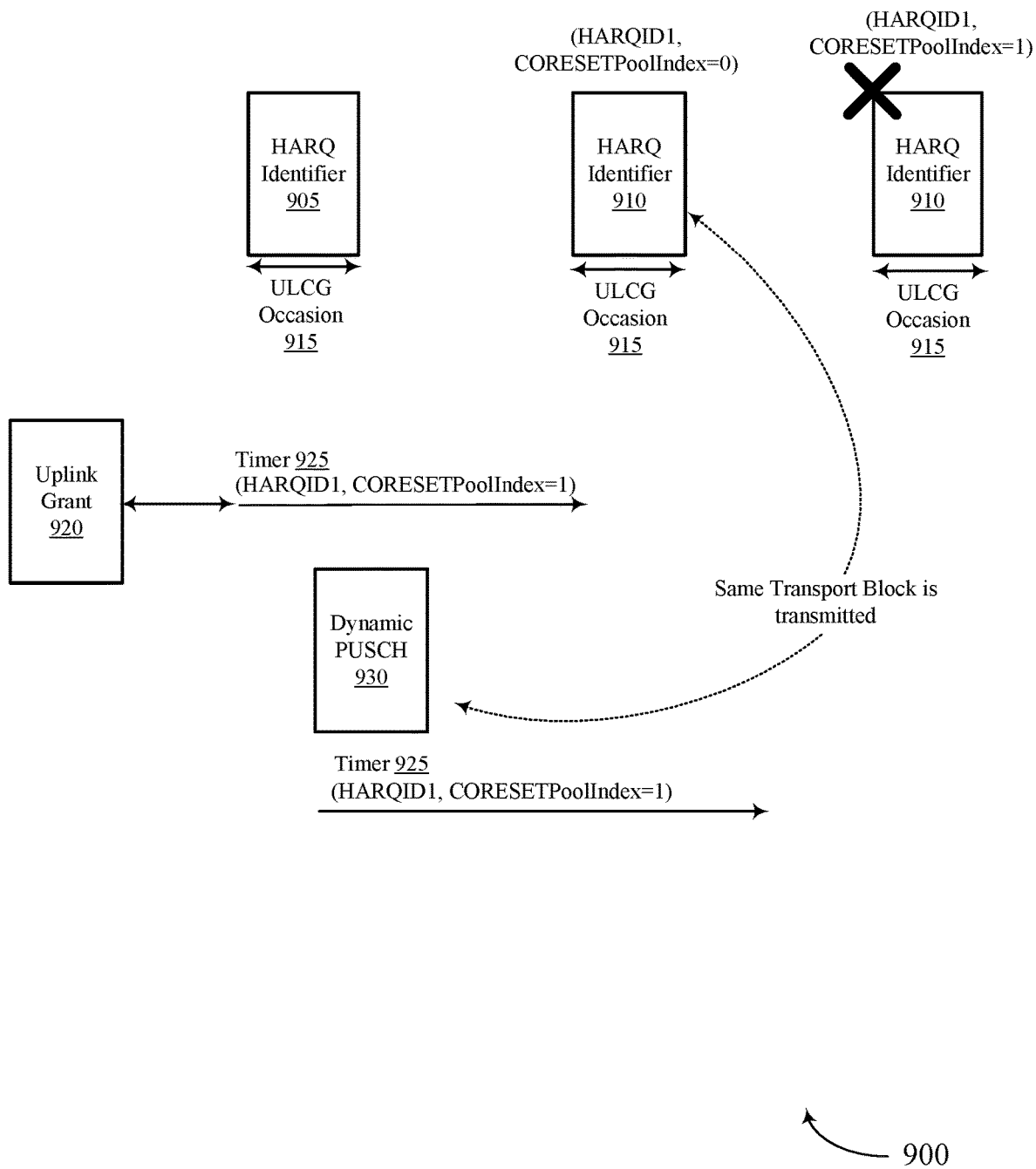

FIG. 9 illustrates an example of a timeline 900 in accordance with aspects of the present disclosure. The timeline 900 may implement aspects of the wireless communications systems 100 and 200 described with reference to FIGS. 1 and 2, respectively. For example, the timeline 900 may be based on a configuration by a base station 105, and implemented by a UE 115, which may be examples of the corresponding devices described with reference to FIGS. 1 and 2. The timeline 900 may support multiple radio access technologies including 4G systems such as LTE systems, LTE-A systems, or LTE-A Pro systems, 5G systems, which may be referred to as NR systems.

The timeline 900 may correspond to a number of HARQ identifiers. For example, the timeline 900 may be associated with a HARQ identifier 905 and a HARQ identifier 910. Each HARQ identifier may correspond to an ULCG occasion 915. In some examples, the UE 115 may be configured to activate or reactivate a timer associated with one of the HARQ identifiers, such as the HARQ identifier 905 or the HARQ identifier 910. Each HARQ identifier 905 and the HARQ identifier 910 may be associated with a CORESET pool index value. For example, the HARQ identifier 905 may be associated with a first value of a CORESET pool index (e.g., CORESTPoolIndex=0) or a second value of a CORESET pool index (e.g., CORESTPoolIndex=1). Similarly, the HARQ identifier 910 may be associated with a first value of a CORESET pool index (e.g., CORESTPoolIndex=0) or a second value of a CORESET pool index (e.g., CORESTPoolIndex=1). The HARQ identifier 910 is associated with CORESETPoolIndex=0 in the second ULCG occasion (e.g., belongs to the first ULCG configuration), but is associated with CORESETPoolIndex=1 in the third ULCG occasion in FIG. 9 (e.g., belongs to the second ULCG configuration).

In the example of FIG. 9, the UE 115 may receive an uplink grant 920 (e.g., a dynamic uplink grant) via a DCI message in a CORESET. In some examples, the uplink grant 920 may be scrambled based in part on a C-RNTI or CS-RNTI. In some examples, the CORESET in which the UE 115 receives the uplink grant 920 may correspond to a value of CORESET pool index. For example, the CORESET in which the UE 115 receives the uplink grant 920 may correspond to a second value of a CORESET pool index (e.g., CORESTPoolIndex=1).

The UE 115 may activate a timer 925 associated with the HARQ identifier 910. For a dynamic grant, the UE 115 may activate or reactivate the timer 925 multiple times. For example, the UE 115 may receive the uplink grant 920 and reactivate the timer 925 based in part on the uplink grant 920. In other words, the UE 115 may be configured to reactivate the timer 925 based in part on reception of the uplink grant 920. The uplink grant 920 may schedule a dynamic PUSCH 930, which may be associated with the HARQ identifier 910. The UE 115 may be configured to reactivate the timer 925 as part of (or prior to) the uplink transmission on the dynamic PUSCH 930 (e.g., when a PUSCH transmission is performed).

In the example of FIG. 9, the UE 115 may be configured to activate (e.g., start) or reactivate (e.g., restart) the timer 925 for a HARQ identifier (e.g., HARQ identifier 910) and exclusively for a CORESET pool index (e.g., CORESTPoolIndex=1) that is associated with the dynamic uplink transmission (e.g., the dynamic PUSCH 930) based in part on a CORESET pool index of the CORESET in which the DCI message is received on. In some examples, while the timer 925 is running, ULCG occasion cancellation and NDI toggling assumption when not cancelling may be performed by the UE 115. The UE 115 may be configured to transmit an uplink transmission using a same transport block for an ULCG occasion when an ULCG is not canceled. The uplink transmission might not be scheduled with a DCI message in which a CRC is scrambled with C-RNTI (exclusively when the DCI message is scrambled with CS-RNTI).

Returning to FIG. 2, in some examples, the UE 115 may be configured to manage a timer associated with a HARQ identifier when the timer for the given HARQ identifier and a given CORESET pool index is running, but at least one ULCG configuration is not configured to be associated with a value of a CORESET pool index and the HARQ identifier belongs to a set of HARQ identifiers configured for that ULCG configuration.

Figure 10:
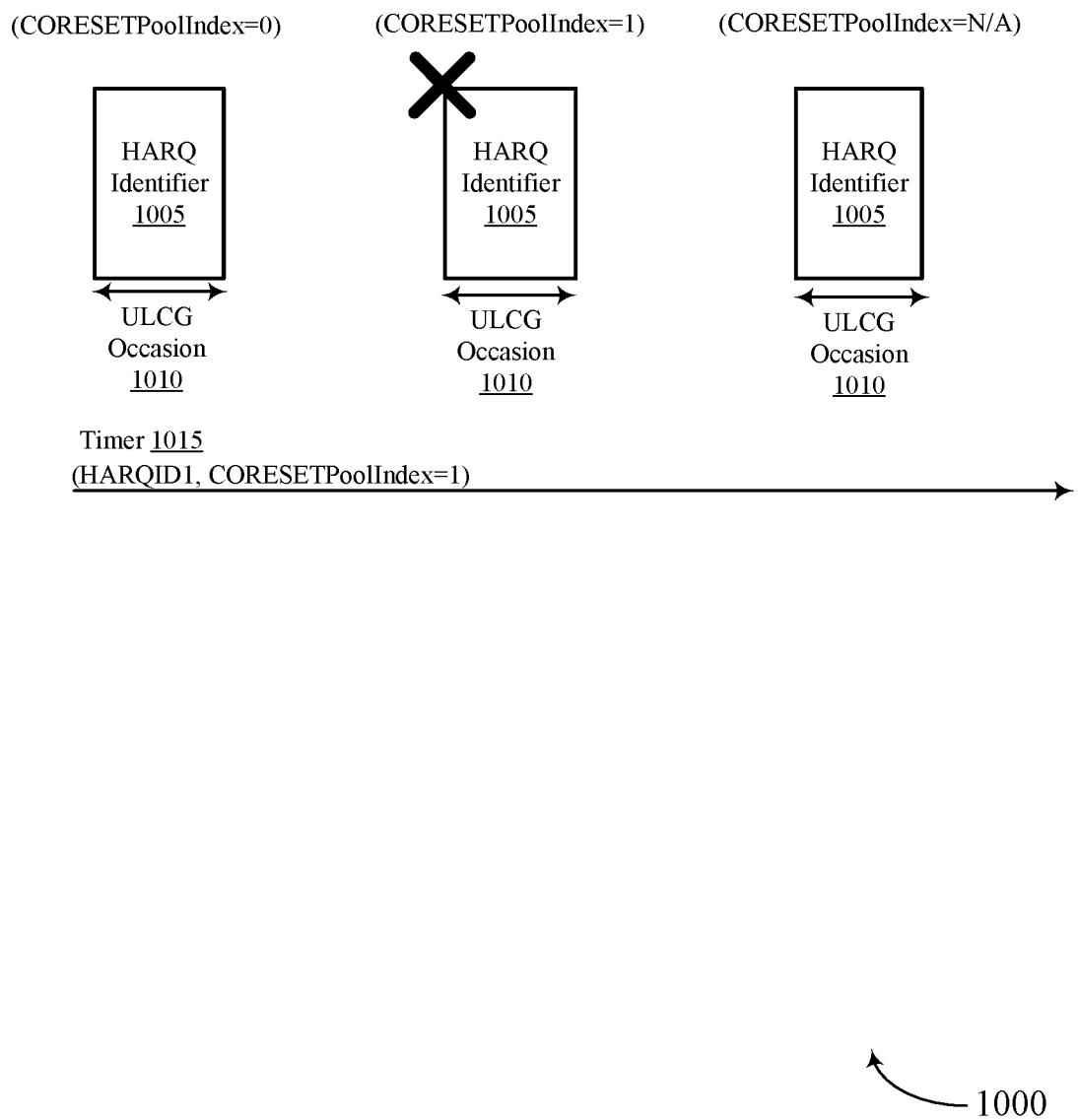

FIG. 10 illustrates an example of a timeline 1000 in accordance with aspects of the present disclosure. The timeline 1000 may implement aspects of the wireless communications systems 100 and 200 described with reference to FIGS. 1 and 2, respectively. For example, the timeline 1000 may be based on a configuration by a base station 105, and implemented by a UE 115, which may be examples of the corresponding devices described with reference to FIGS. 1 and 2. The timeline 1000 may support multiple radio access technologies including 4G systems such as LTE systems, LTE-A systems, or LTE-A Pro systems, 5G systems, which may be referred to as NR systems.

The timeline 1000 may correspond to a number of HARQ identifiers. For example, the timeline 1000 may be associated with a HARQ identifier 1005. Each HARQ identifier may correspond to an ULCG occasion 1010. In some examples, the UE 115 may be configured to activate or reactivate a timer associated with one of the HARQ identifiers, such as the HARQ identifier 1005. In the example of FIG. 10, the UE 115 may activate a timer 1015 that may be associated with the HARQ identifier 1005 and a value of a CORESET pool index (e.g., CORESETPoolIndex=1). That is, a HARQ identifier associated with the timer 1015 is the same as the HARQ identifiers 1005.

In some examples, the UE 115 may be configured to refrain from transmitting one or more uplink transmissions (e.g., one or more PUSCH transmissions) associated with a HARQ identifier and a value of a CORESET pool index associated with the timer 1015. In other words, if a timer for a HARQ identifier and a value of a CORESET pool index is running, transmission of a ULCG occasion with that HARQ identifier and the value of the CORESET pool index is canceled. For example, the UE 115 may be configured to refrain from transmitting one or more uplink transmissions (e.g., one or more PUSCH transmissions) associated with the HARQ identifier 1005 and the value of a COREST pool index (e.g., CORESETPoolIndex=1), while the timer 1015 is active (e.g., running).

In some examples, any ULCG configuration not configured to be associated with a value of a CORESET pool index is assumed to be associated with a specific value of the CORESET pool index (e.g., CORESETPoolIndex=0). In some other examples, any ULCG configuration is canceled if the timer is running for that HARQ identifier irrespective of a value of a CORESET pool index for the timer. In other examples, any ULCG configuration is not canceled even if the timer is running for that HARQ identifier irrespective of a value of a CORESET pool index for the timer, and an NDI value is assumed to be not toggled, and the same transport block is transmitted.

Returning to FIG. 2, the operations performed by the TRPs 105 and the UE 115, for example, may thus provide improvements to directional operations in the wireless communications system 200, as well as extend PUSCH coverage. Further, the operations performed by the TRPs 105 and the UE 115 may provide benefits and enhancements to the operation of the UE 115. For example, by supporting ULCG using multi-DCI messaging framework in the wireless communications system 200, various operational characteristics, such as power consumption, may be reduced. The operations performed by the TRPs 105 and the UE 115 may also promote efficiency of the UE 115 by reducing latency associated with processes related to high reliability and low latency directional communications, among other examples.

Figure 11:
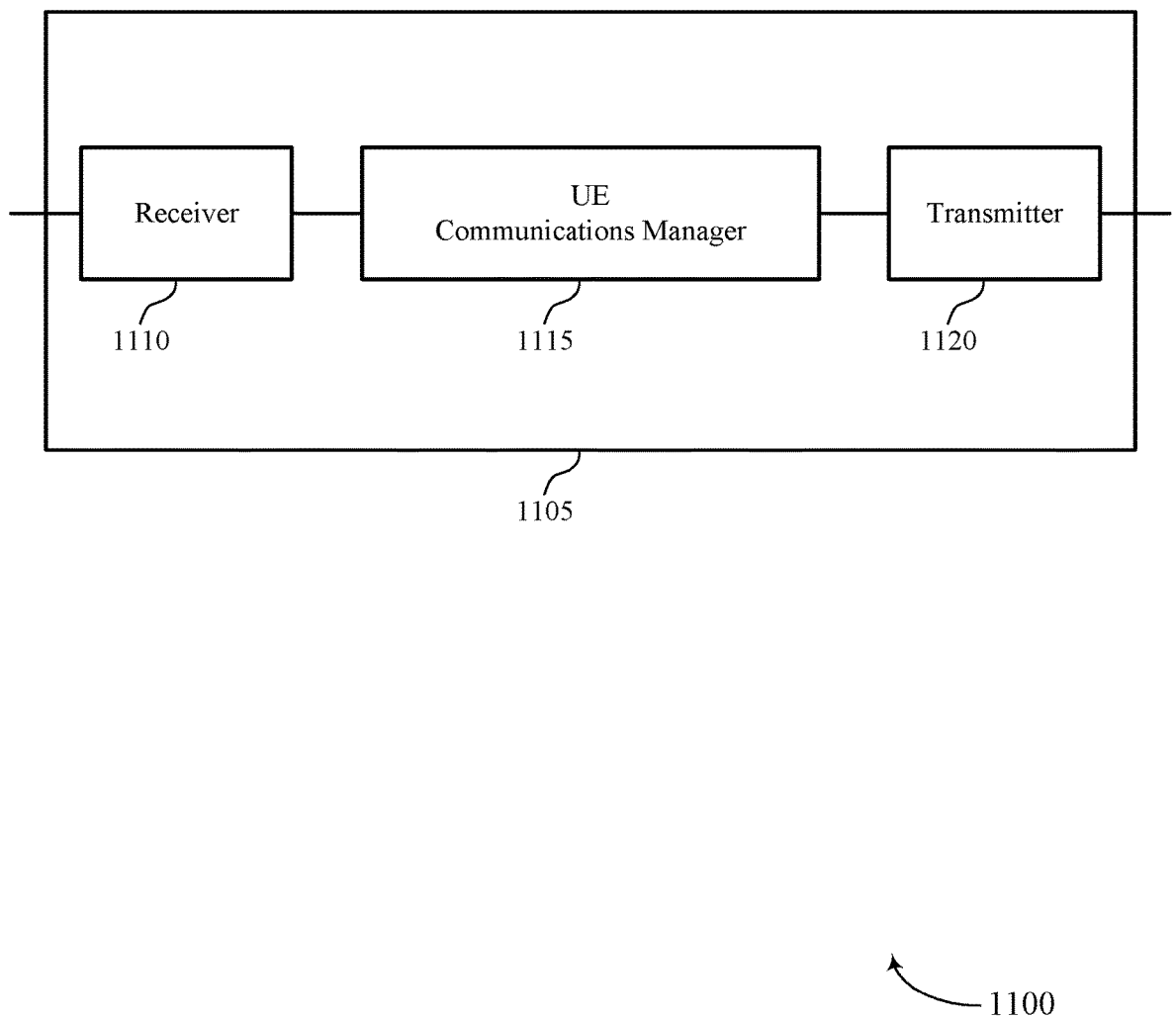
FIGS. 11 and 12 show diagrams of devices in accordance with aspects of the present disclosure.

FIG. 11 shows a block diagram 1100 of a device 1105 in accordance with aspects of the present disclosure. The device 1105 may be an example of aspects of a UE 115 as described herein. The device 1105 may include a receiver 1110, a UE communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to ULCGs using multi-DCI messaging based framework, etc.). Information may be passed on to other components of the device 1105. The receiver 1110 may be an example of aspects of the transceiver 1420 described with reference to FIG. 14. The receiver 1110 may utilize a single antenna or a set of antennas.

The UE communications manager 1115 may receive a first ULCG configuration corresponding to a first value of a CORESET pool index, receive a second ULCG configuration corresponding to a second value of the CORESET pool index different from the first value of the CORESET pool index, and transmit a first uplink transmission during a first uplink grant occasion according to the first ULCG configuration and a second uplink transmission during a second uplink grant occasion according to the second ULCG configuration, where both the first uplink transmission and the second uplink transmission correspond to a same transport block and a HARQ identifier. The UE communications manager 1115 may be an example of aspects of the UE communications manager 1410 described herein.

The UE communications manager 1115, or its sub-components, may be implemented in hardware, code (e.g., software or firmware) executed by a processor, or any combination thereof. If implemented in code executed by a processor, the functions of the UE communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 1115, or its sub-components, may be physically located at various positions, including being distributed such that portions of functions are implemented at different physical locations by one or more physical components. In some examples, the UE communications manager 1115, or its sub-components, may be a separate and distinct component in accordance with various aspects of the present disclosure. In some examples, the UE communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
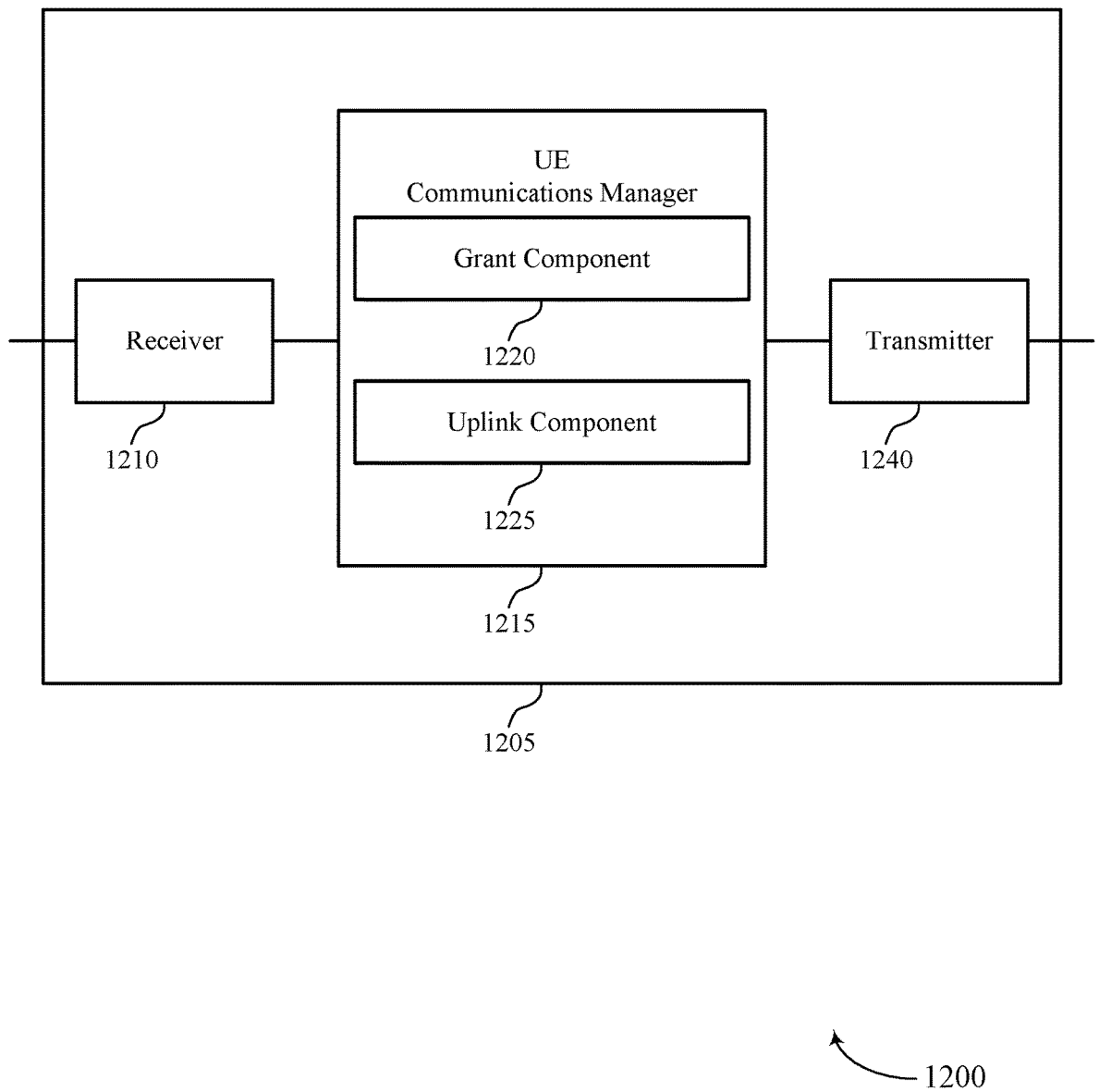

FIG. 12 shows a block diagram 1200 of a device 1205 in accordance with aspects of the present disclosure. The device 1205 may be an example of aspects of a device 1105, or a UE 115 as described herein. The device 1205 may include a receiver 1210, a UE communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to ULCGs using multi-DCI messaging based framework, etc.). Information may be passed on to other components of the device 1205. The receiver 1210 may be an example of aspects of the transceiver 1420 described with reference to FIG. 14. The receiver 1210 may utilize a single antenna or a set of antennas.

The UE communications manager 1215 may be an example of aspects of the UE communications manager 1115 as described herein. The UE communications manager 1215 may include a grant component 1220 and an uplink component 1225. The UE communications manager 1215 may be an example of aspects of the UE communications manager 1410 described herein.

The grant component 1220 may receive a first ULCG configuration corresponding to a first value of a CORESET pool index and receive a second ULCG configuration corresponding to a second value of the CORESET pool index different from the first value of the CORESET pool index. The uplink component 1225 may transmit a first uplink transmission during a first uplink grant occasion according to the first uplink grant configuration and a second uplink transmission during a second uplink grant occasion according to the second ULCG configuration, where both the first uplink transmission and the second uplink transmission correspond to a same transport block and a HARQ identifier.

The transmitter 1230 may transmit signals generated by other components of the device 1205. In some examples, the transmitter 1230 may be collocated with a receiver 1210 in a transceiver component. For example, the transmitter 1230 may be an example of aspects of the transceiver 1420 described with reference to FIG. 14. The transmitter 1230 may utilize a single antenna or a set of antennas.

Figure 13:
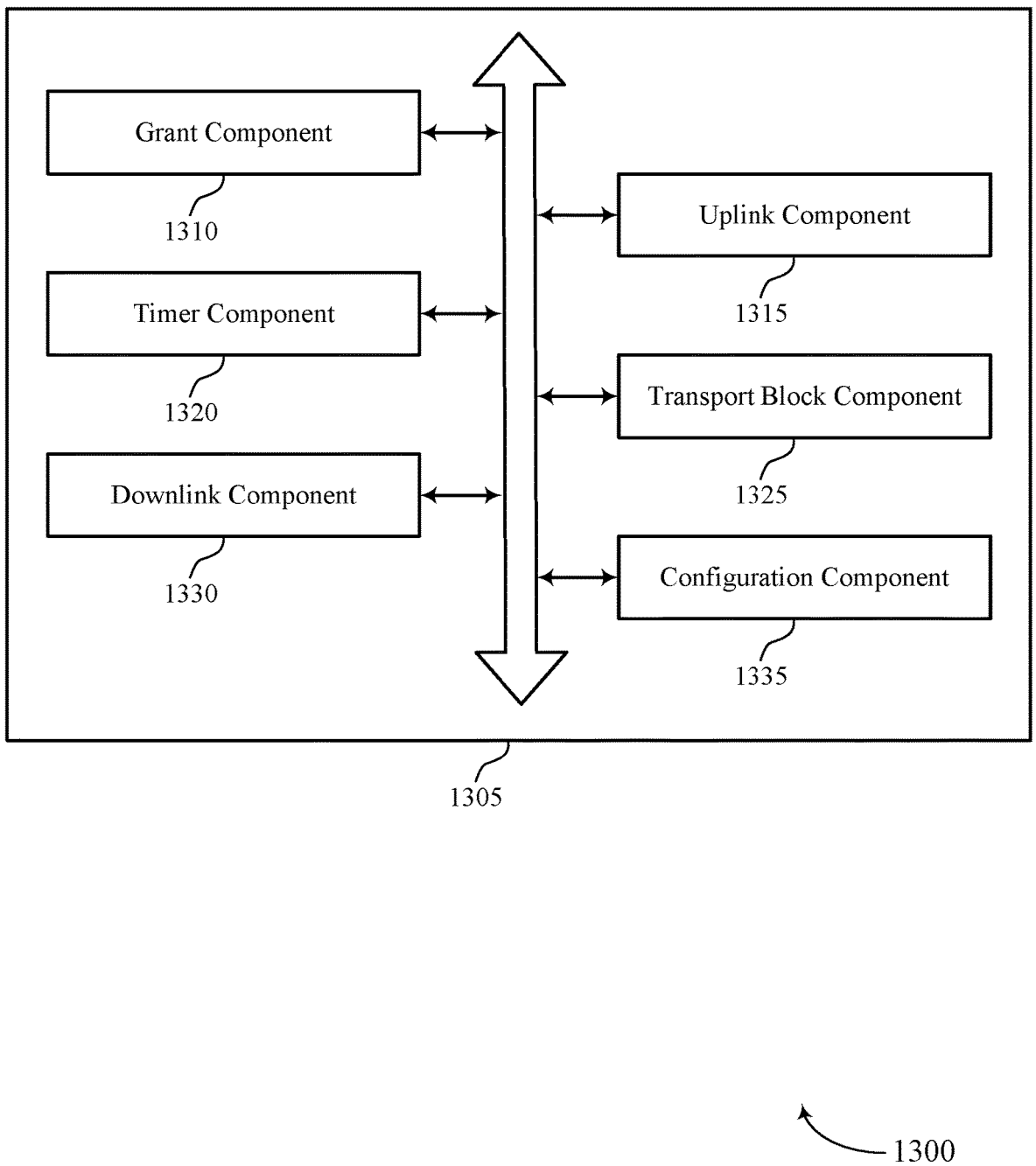
FIG. 13 shows a diagram of a user equipment (UE) communications manager in accordance with aspects of the present disclosure.

FIG. 13 shows a block diagram 1300 of a UE communications manager 1305 in accordance with aspects of the present disclosure. The UE communications manager 1305 may be an example of aspects of a UE communications manager 1115, a UE communications manager 1215, or a UE communications manager 1410 described herein. The UE communications manager 1305 may include a grant component 1310, an uplink component 1315, a timer component 1320, a transport block component 1325, a downlink component 1330, and a configuration component 1335. Each of these components may communicate, directly or indirectly, with one another (e.g., via one or more buses).

The grant component 1310 may receive a first uplink grant configuration corresponding to a first value of a CORESET pool index. In some examples, the grant component 1310 may receive a second ULCG configuration corresponding to a second value of the CORESET pool index different from the first value of the CORESET pool index. In some cases, the first ULCG configuration and the second ULCG configuration are configured with a same set of HARQ identifiers, where the set of HARQ identifiers includes the HARQ identifier associated with the first uplink grant occasion and the second uplink grant occasion. In some cases, the first ULCG configuration and the second ULCG configuration are associated with a same periodicity.

In some examples, the grant component 1310 may receive a third ULCG configuration associated with a third uplink grant occasion and corresponding to the HARQ identifier, where the HARQ identifier is associated with the first ULCG configuration, the second ULCG configuration, and the third ULCG configuration. In some examples, the grant component 1310 may determine that the third ULCG configuration is noncorresponding to one or both of the first value and the second value of the CORESET pool index. In some examples, the grant component 1310 may associate the first value of the CORESET pool index with the third ULCG configuration based on determining that the third ULCG configuration is noncorresponding to one or both of the first value and the second value of the CORESET pool index.

The uplink component 1315 may transmit a first uplink transmission during a first uplink grant occasion according to the first ULCG configuration and a second uplink transmission during a second uplink grant occasion according to the second ULCG configuration, where both the first uplink transmission and the second uplink transmission correspond to a same transport block and a HARQ identifier.

The timer component 1320 may maintain a timer associated with one or both of the HARQ identifier and one or more of the first value of the CORESET pool index or the second value of the CORESET pool index. In some examples, the timer component 1320 may terminate the first uplink transmission during the first uplink grant occasion based on a timer, where the timer corresponds to the HARQ identifier and the first value of the CORESET pool index. In some examples, the timer component 1320 may refrain from terminating the second uplink transmission during the second uplink grant occasion based on the timer, where the second uplink grant occasion corresponds to the HARQ identifier and the second value of the CORESET pool index.

In some examples, the timer component 1320 may determine that a value of an NDI is unchanged. In some examples, the timer component 1320 may transmit, based on that the value of the NDI is unchanged, the second uplink transmission during the second uplink grant occasion and according to the second ULCG configuration using the same transport block. In some examples, the timer component 1320 may terminate a third uplink transmission during the third uplink grant occasion based on a timer, where the timer corresponds to the HARQ identifier. In some examples, the timer component 1320 may transmit a third uplink transmission using the same transport block during the third uplink grant occasion based on that the value of the NDI is unchanged.

In some examples, the timer component 1320 may activate a timer associated with the first ULCG configuration or the second ULCG configuration. In some examples, the timer component 1320 may reactivate the timer based on the received DCI message scheduling the uplink shared channel. In some examples, the timer component 1320 may reactivate the timer based on transmitting the uplink shared channel. In some cases, the timer is irrespective of one or both of the first value and the second value of the CORESET pool index.

The transport block component 1325 may determine, based on one or more scheduling parameters, one or both of a first transport block size for a first transport block associated with the first uplink grant occasion and a second transport block size for a second transport block associated with the second uplink grant occasion. In some cases, the first transport block size and the second transport block size are a same transport block size, and where transmitting the first uplink transmission and the second uplink transmission using the same transport block is based on the that the first transport block size and the second transport block size are the same transport block size. In some cases, the one or more scheduling parameters includes an MCS scheme, a FDRA, a TDRA, a number of layers, or a combination thereof.

The downlink component 1330 may receive a DCI message scheduling an uplink shared channel, where the uplink shared channel corresponds to the HARQ identifier associated with a set of HARQ identifiers and corresponds to the first ULCG configuration or the second ULCG configuration. In some examples, the downlink component 1330 may transmit the uplink shared channel using the same transport block. In some examples, the downlink component 1330 may determine that the scheduled uplink shared channel corresponds to the first value of the CORESET pool index or the second value of the CORESET pool index based on a CORESET pool index associated with a CORESET that the DCI message is received.

In some examples, the downlink component 1330 may receive a DCI message in a CORESET, where the received DCI message activates the first ULCG configuration or the second ULCG configuration based on a value of the control resource pool index of the CORESET associated with the received DCI message, and the value of the CORESET pool index corresponds to the first value or the second value. In some cases, the DCI message is scrambled with a configured-scheduling radio network temporary identifier.

The configuration component 1335 may receive, via higher layer signaling, a configuration including a first association between the first value of the CORESET pool index and the first ULCG configuration and a second association between the second value of the CORESET pool index and the second ULCG configuration. In some cases, one or both of the first ULCG configuration and the second ULCG configuration correspond to a first type of ULCG configuration or a second type of ULCG configuration. In some cases, the higher layer signaling includes radio resource control signaling.

Figure 14:
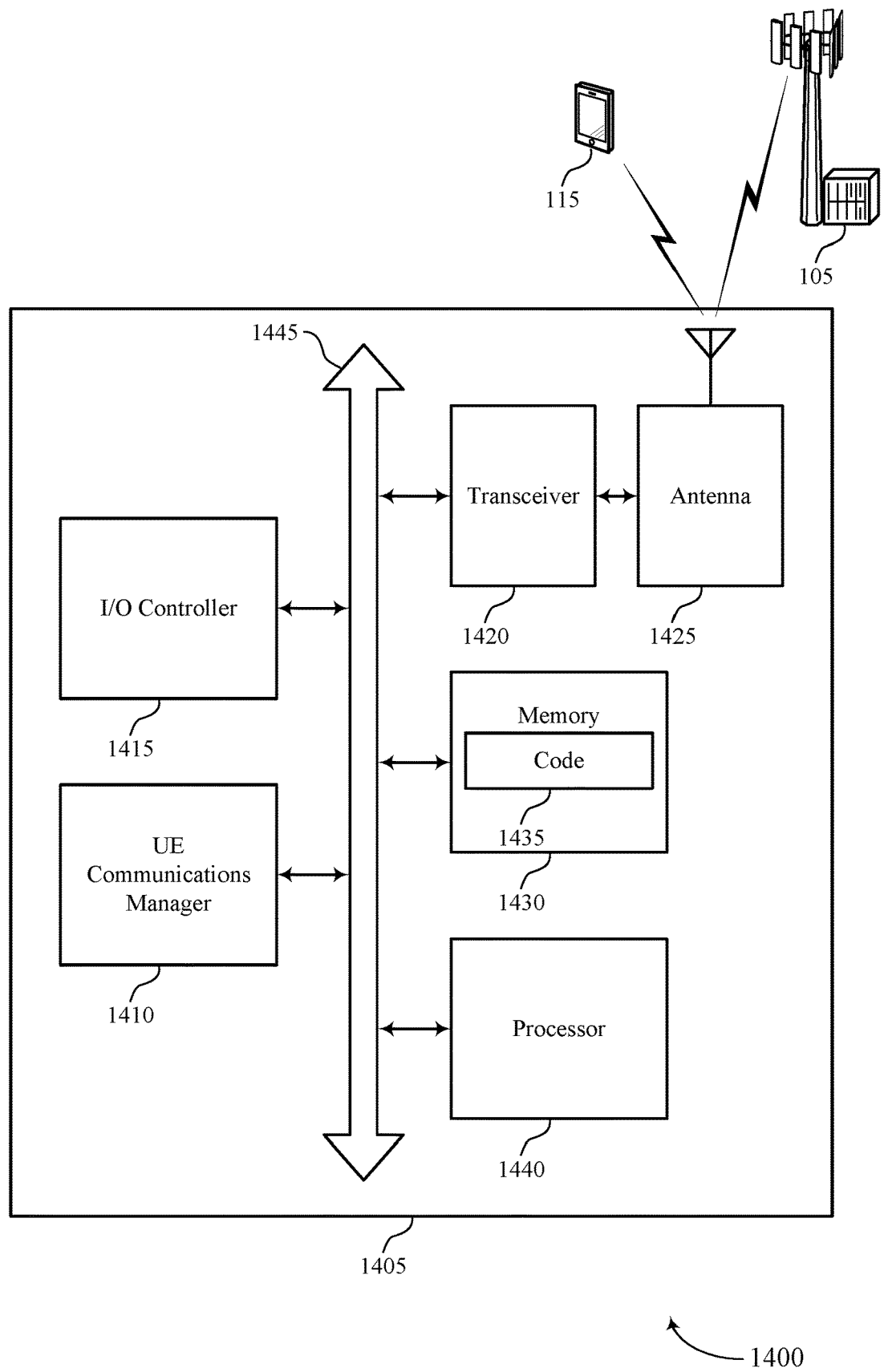
FIG. 14 shows a diagram of a system including a device in accordance with aspects of the present disclosure.

FIG. 14 shows a diagram of a system 1400 including a device 1405 in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a UE communications manager 1410, an I/O controller 1415, a transceiver 1420, an antenna 1425, memory 1430, and a processor 1440. These components may be in electronic communication via one or more buses (e.g., bus 1445).

The UE communications manager 1410 as described herein may be implemented to realize one or more potential improvements. One implementation may allow the device 1405 to reduce power consumption when providing uplink communications in a wireless communications systems, such as in 5G systems. Another implementation may allow the device 1405 to support higher reliability and low latency uplink operations by supporting using a same transport block for multiple PUSCH, and related to multiple ULCG occasions and multiple ULCG configurations.

The UE communications manager 1410 may determine a first ULCG configuration corresponding to a first value of a CORESET pool index, determine a second ULCG configuration corresponding to a second value of the CORESET pool index different from the first value of the CORESET pool index, and transmit a first uplink transmission during a first uplink grant occasion according to the first ULCG configuration and a second uplink transmission during a second uplink grant occasion according to the second ULCG configuration, where both the first uplink transmission and the second uplink transmission correspond to a same transport block and a HARQ identifier.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the device 1405 may include a single antenna 1425. However, in some cases, the device 1405 may have more than one antenna 1425, which may be capable of concurrently transmitting or receiving multiple wireless transmissions.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting ULCGs using multi-DCI messaging based framework).

Figure 15:
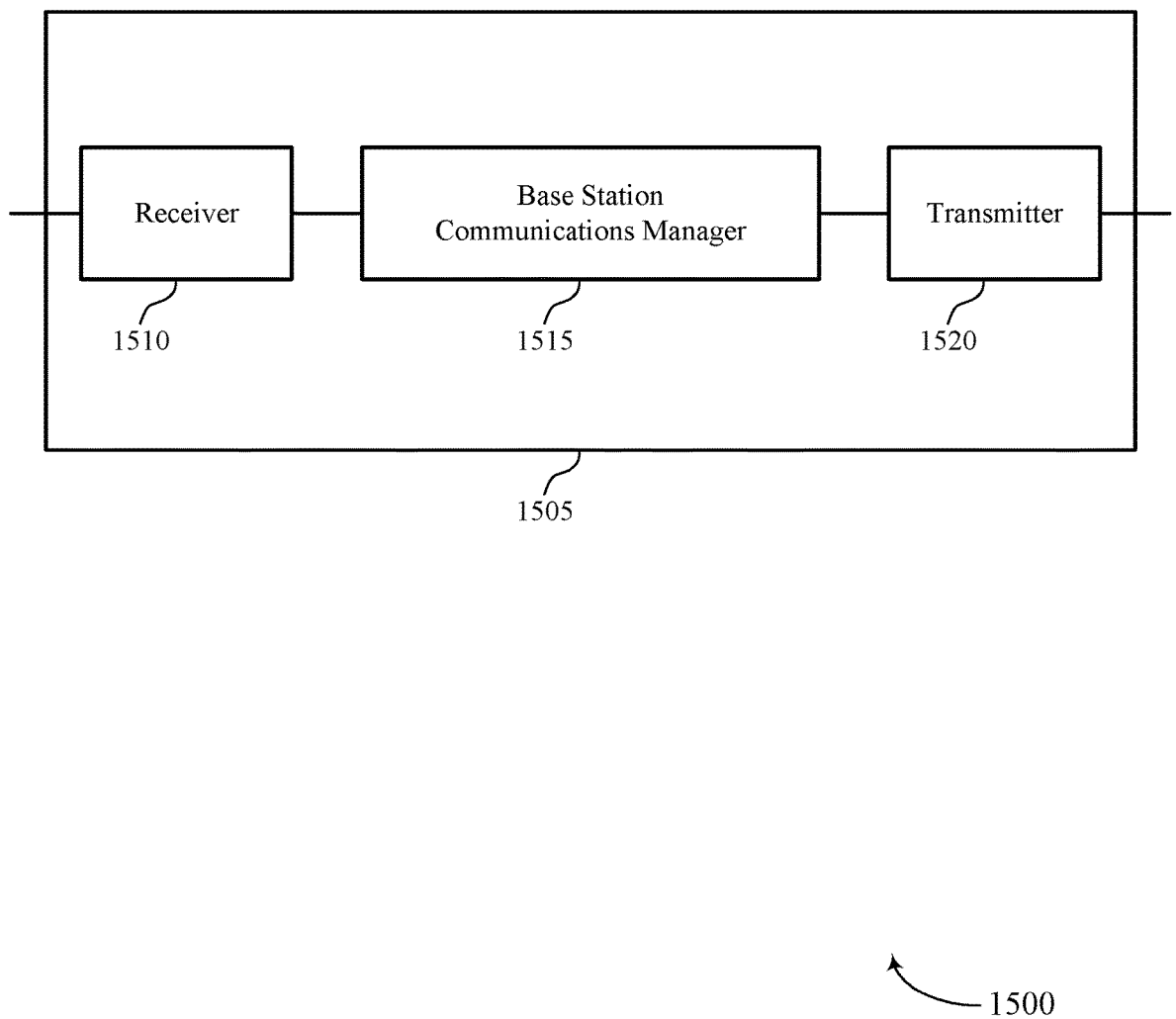
FIGS. 15 and 16 show diagrams of devices in accordance with aspects of the present disclosure.

FIG. 15 shows a block diagram 1500 of a device 1505 in accordance with aspects of the present disclosure. The device 1505 may be an example of aspects of a base station 105 as described herein. The device 1505 may include a receiver 1510, a base station communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to ULCGs using multi-DCI messaging based framework, etc.). Information may be passed on to other components of the device 1505. The receiver 1510 may be an example of aspects of the transceiver 1820 described with reference to FIG. 18. The receiver 1510 may utilize a single antenna or a set of antennas.

The base station communications manager 1515 may receive a first uplink transmission during a first uplink grant occasion according to a first ULCG configuration and a second uplink transmission during a second uplink grant occasion according to a second ULCG configuration, where the first ULCG configuration corresponds to a first value of a CORESET pool index and the second ULCG configuration corresponds to a second value of the CORESET pool index different from the first value of the CORESET pool index, and where both the first uplink transmission and the second uplink transmission correspond to a same transport block and a HARQ identifier and decode the first uplink transmission and the second uplink transmission. The base station communications manager 1515 may be an example of aspects of the base station communications manager 1810 described herein.

The base station communications manager 1515, or its sub-components, may be implemented in hardware, code (e.g., software or firmware) executed by a processor, or any combination thereof. If implemented in code executed by a processor, the functions of the base station communications manager 1515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1515, or its sub-components, may be physically located at various positions, including being distributed such that portions of functions are implemented at different physical locations by one or more physical components. In some examples, the base station communications manager 1515, or its sub-components, may be a separate and distinct component in accordance with various aspects of the present disclosure. In some examples, the base station communications manager 1515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver component. For example, the transmitter 1520 may be an example of aspects of the transceiver 1820 described with reference to FIG. 18. The transmitter 1520 may utilize a single antenna or a set of antennas.

Figure 16:
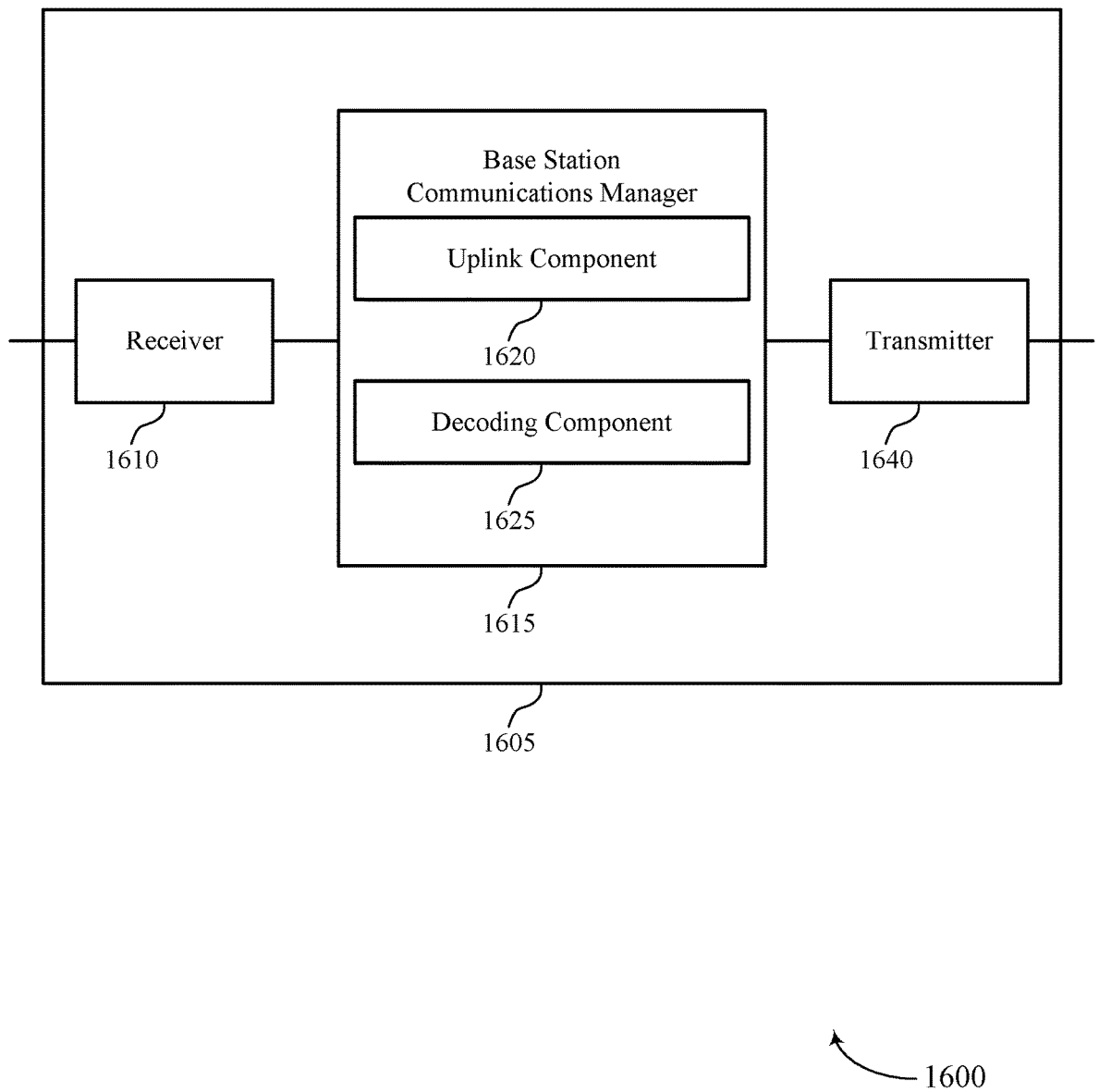

FIG. 16 shows a block diagram 1600 of a device 1605 in accordance with aspects of the present disclosure. The device 1605 may be an example of aspects of a device 1505, or a base station 105 as described herein. The device 1605 may include a receiver 1610, a base station communications manager 1615, and a transmitter 1630. The device 1605 may also include a processor. Each of these components may be in communication with one another (e.g., via one or more buses).

The receiver 1610 may receive information such as packets, user data, or control information associated with various information channels (e.g., control channels, data channels, and information related to ULCGs using multi-DCI messaging based framework, etc.). Information may be passed on to other components of the device 1605. The receiver 1610 may be an example of aspects of the transceiver 1820 described with reference to FIG. 18. The receiver 1610 may utilize a single antenna or a set of antennas.

The base station communications manager 1615 may be an example of aspects of the base station communications manager 1515 as described herein. The base station communications manager 1615 may include an uplink component 1620 and a decoding component 1625. The base station communications manager 1615 may be an example of aspects of the base station communications manager 1810 described herein.

The uplink component 1620 may receive a first uplink transmission during a first uplink grant occasion according to a first ULCG configuration and a second uplink transmission during a second uplink grant occasion according to a second ULCG configuration, where the first ULCG configuration corresponds to a first value of a CORESET pool index and the second ULCG configuration corresponds to a second value of the CORESET pool index different from the first value of the CORESET pool index, and where both the first uplink transmission and the second uplink transmission correspond to a same transport block and a HARQ identifier. The decoding component 1625 may decode the first uplink transmission and the second uplink transmission.

The transmitter 1630 may transmit signals generated by other components of the device 1605. In some examples, the transmitter 1630 may be collocated with a receiver 1610 in a transceiver component. For example, the transmitter 1630 may be an example of aspects of the transceiver 1820 described with reference to FIG. 18. The transmitter 1630 may utilize a single antenna or a set of antennas.

Figure 17:
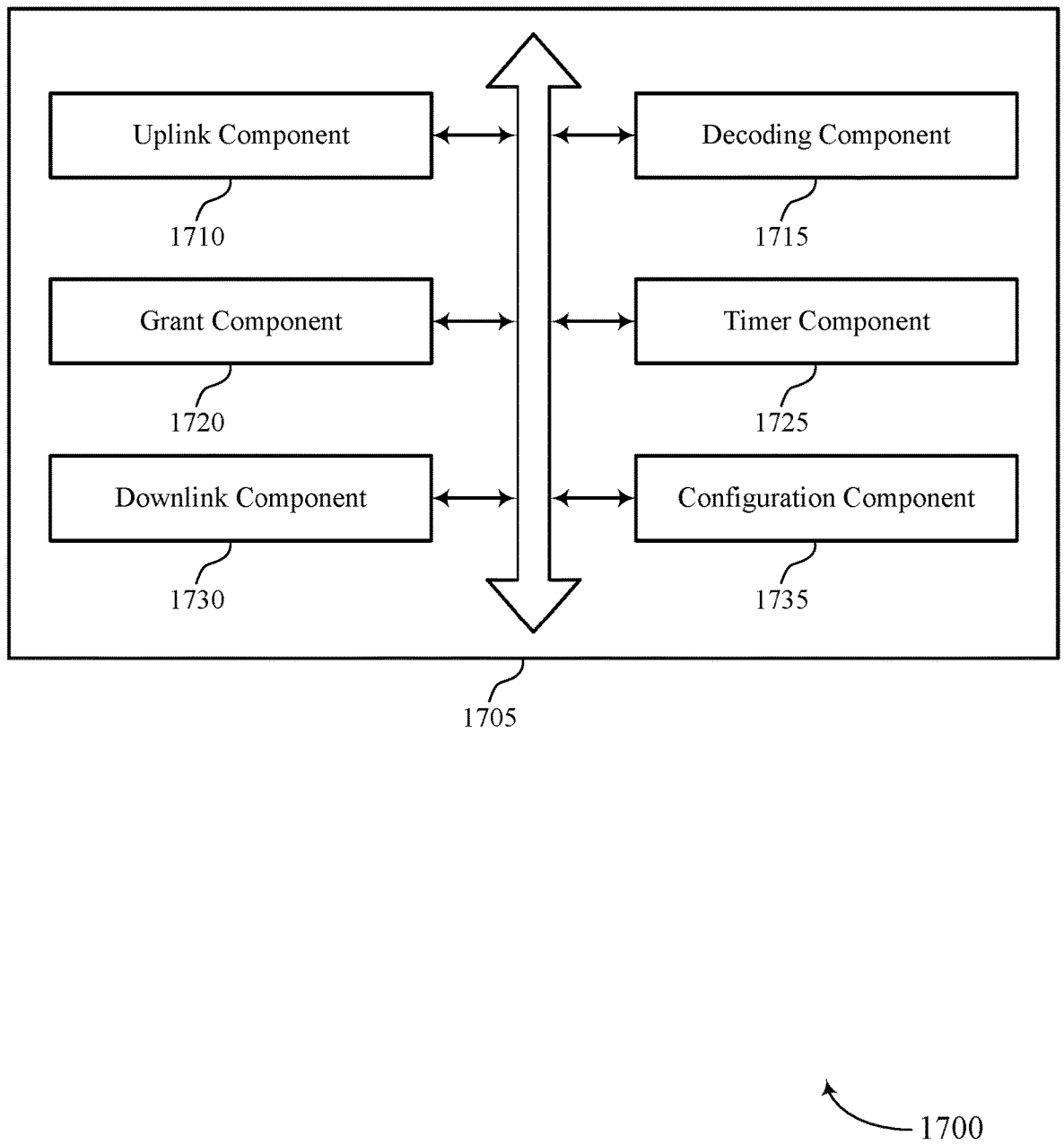
FIG. 17 shows a diagram of a base station communications manager in accordance with aspects of the present disclosure.

FIG. 17 shows a block diagram 1700 of a base station communications manager 1705 in accordance with aspects of the present disclosure. The base station communications manager 1705 may be an example of aspects of a base station communications manager 1515, a base station communications manager 1615, or a base station communications manager 1810 described herein. The base station communications manager 1705 may include an uplink component 1710, a decoding component 1715, a grant component 1720, a timer component 1725, a downlink component 1730, and a configuration component 1735. Each of these components may communicate, directly or indirectly, with one another (e.g., via one or more buses).

The uplink component 1710 may receive a first uplink transmission during a first uplink grant occasion according to a first ULCG configuration and a second uplink transmission during a second uplink grant occasion according to a second ULCG configuration, where the first ULCG configuration corresponds to a first value of a CORESET pool index and the second ULCG configuration corresponds to a second value of the CORESET pool index different from the first value of the CORESET pool index, and where both the first uplink transmission and the second uplink transmission correspond to a same transport block and a HARQ identifier. The decoding component 1715 may decode the first uplink transmission and the second uplink transmission.

The grant component 1720 may configured the first ULCG configuration and the second ULCG configuration with a same set of HARQ identifiers, where the set of HARQ identifiers includes the HARQ identifier associated with the first uplink grant occasion and the second uplink grant occasion. In some cases, the first ULCG configuration and the second ULCG configuration are associated with a same periodicity. The timer component 1725 may transmit a timer configuration corresponding to a timer associated with one or both of the HARQ identifier and one or more of the first value of the CORESET pool index or the second value of the CORESET pool index. In some cases, the timer is irrespective of one or both of the first value and the second value of the CORESET pool index.

The downlink component 1730 may transmit a DCI message scheduling an uplink shared channel, where the uplink shared channel corresponds to the HARQ identifier associated with a set of HARQ identifiers and corresponds to the first ULCG configuration or the second ULCG configuration. In some examples, the downlink component 1730 may receive the uplink shared channel on the same transport block. In some examples, the downlink component 1730 may scramble the DCI message with a CS-RNTI. In some examples, the downlink component 1730 may transmit a DCI message in a CORESET, where the transmitted DCI message activates the first ULCG configuration or the second ULCG configuration based on a value of the control resource pool index of the CORESET associated with the transmitted DCI message, and the value of the CORESET pool index corresponds to the first value or the second value.

The configuration component 1735 may transmit, via higher layer signaling, a configuration including a first association between the first value of the CORESET pool index and the first ULCG configuration and a second association between the second value of the CORESET pool index and the second ULCG configuration. In some cases, one or both of the first ULCG configuration and the second ULCG configuration correspond to a first type of ULCG configuration or a second type of ULCG configuration. In some cases, the higher layer signaling includes RRC signaling.

Figure 18:
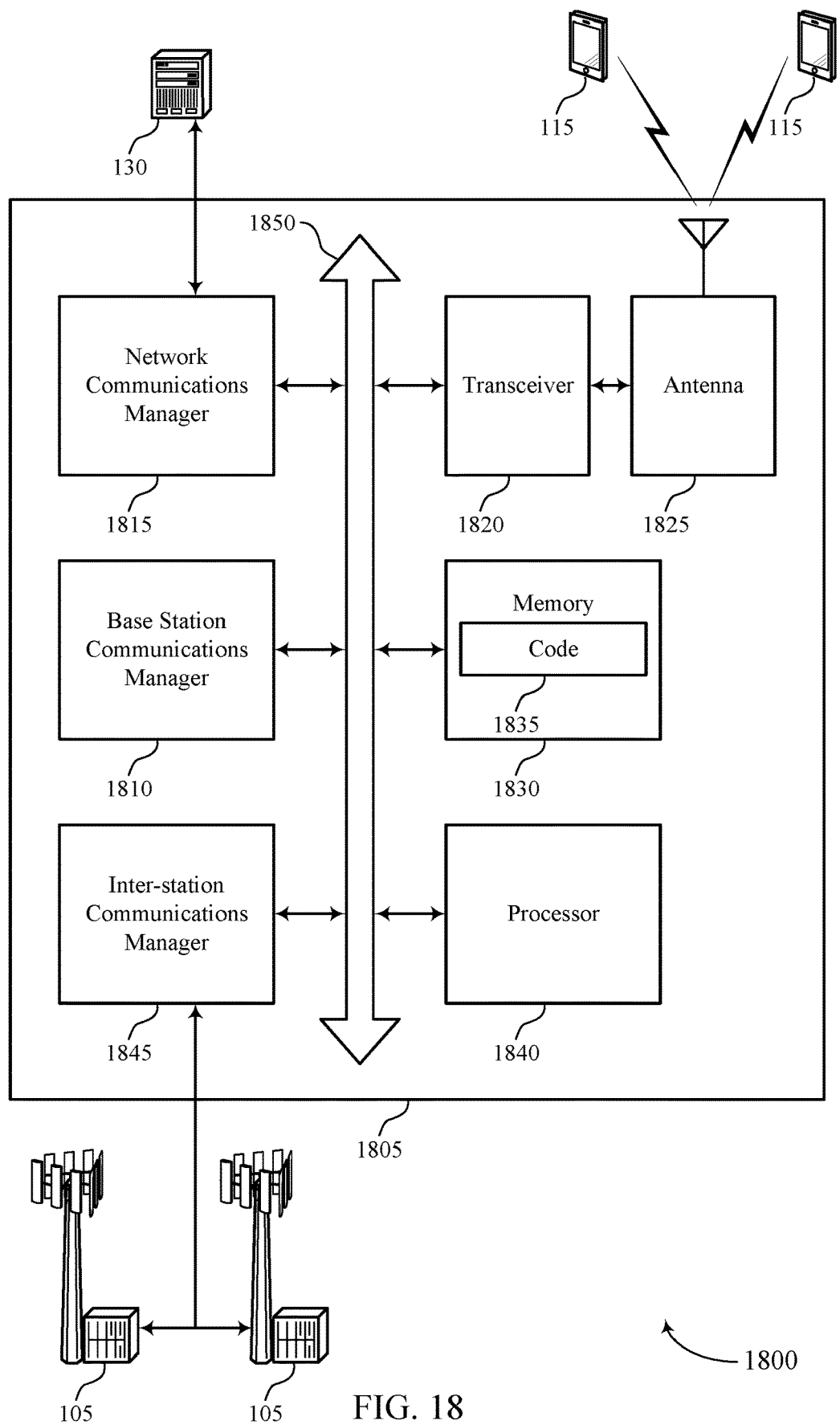
FIG. 18 shows a diagram of a system including a device in accordance with aspects of the present disclosure

FIG. 18 shows a diagram of a system 1800 including a device 1805 in accordance with aspects of the present disclosure. The device 1805 may be an example of or include the components of device 1505, device 1605, or a base station 105 as described herein. The device 1805 may include components for bi-directional voice and data communications including components for transmitting and receiving communications, including a base station communications manager 1810, a network communications manager 1815, a transceiver 1820, an antenna 1825, memory 1830, a processor 1840, and an inter-station communications manager 1845. These components may be in electronic communication via one or more buses (e.g., bus 1850).

The base station communications manager 1810 as described herein may be implemented to realize one or more potential improvements. One implementation may allow the device 1805 to reduce power consumption when providing wireless communications in a wireless communications systems, such as in 5G systems. Another implementation may allow the device 1805 to support higher reliability and low latency wireless communications by supporting a same transport block for multiple PUSCH reception, and related to multiple ULCG occasions and multiple ULCG configurations.

The base station communications manager 1810 may receive a first uplink transmission during a first uplink grant occasion according to a first ULCG configuration and a second uplink transmission during a second uplink grant occasion according to a second ULCG configuration, where the first ULCG configuration corresponds to a first value of a CORESET pool index and the second ULCG configuration corresponds to a second value of the CORESET pool index different from the first value of the CORESET pool index, and where both the first uplink transmission and the second uplink transmission correspond to a same transport block and a HARQ identifier and decode the first uplink transmission and the second uplink transmission.

The network communications manager 1815 may manage communications with the core network (e.g., via one or more wired backhaul links). For example, the network communications manager 1815 may manage the transfer of data communications for client devices, such as one or more UEs 115.

The transceiver 1820 may communicate bi-directionally, via one or more antennas, wired, or wireless links as described herein. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas. In some cases, the device 1805 may include a single antenna 1825. However, in some cases, the device 1805 may have more than one antenna 1825, which may be capable of concurrently transmitting or receiving multiple wireless transmissions.

The memory 1830 may include RAM, ROM, or a combination thereof. The memory 1830 may store computer-readable code 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some cases, a memory controller may be integrated into processor 1840. The processor 1840 may be configured to execute computer-readable instructions stored in a memory (e.g., the memory 1830) to cause the device 1805 to perform various functions (e.g., functions or tasks supporting ULCGs using multi-DCI messaging based framework).

The inter-station communications manager 1845 may manage communications with other base station 105, and may include a controller or scheduler for controlling communications with UEs 115 in cooperation with other base stations 105. For example, the inter-station communications manager 1845 may coordinate scheduling for transmissions to Ues 115 for various interference mitigation techniques such as beamforming or joint transmission. In some examples, the inter-station communications manager 1845 may provide an X2 interface within an LTE/LTE-A wireless communication network technology to provide communication between base stations 105.

Figure 19:
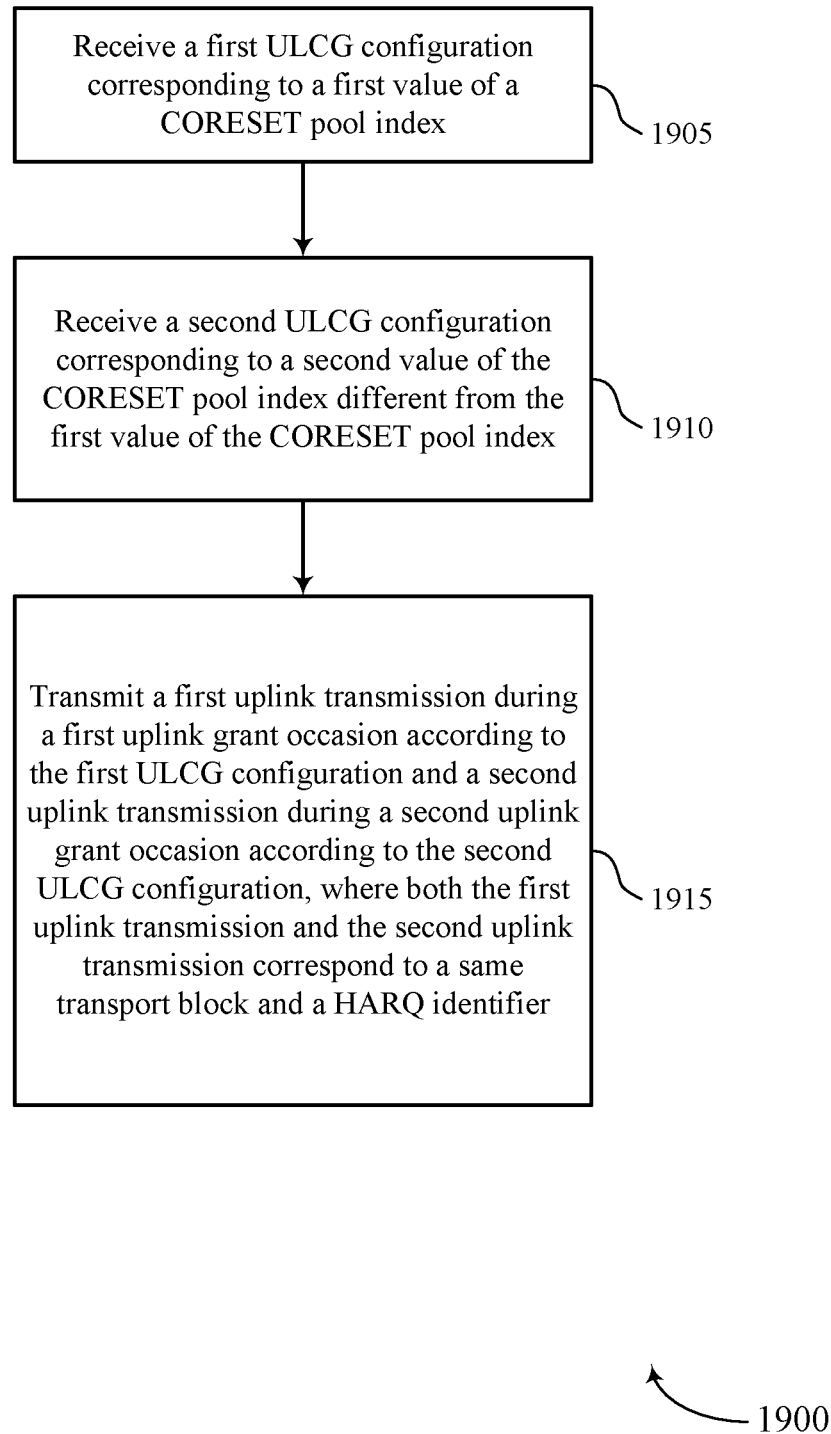
FIGS. 19 through 22 show flowcharts illustrating methods in accordance with aspects of the present disclosure.

FIG. 19 shows a flowchart illustrating a method 1900 in accordance with aspects of the present disclosure. The operations of method 1900 may be implemented by a UE 115 or its components as described herein. For example, the operations of method 1900 may be performed by a UE communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 1905, the UE may receive a first ULCG configuration corresponding to a first value of a CORESET pool index. The operations of 1905 may be performed according to the methods described herein. In some examples, aspects of the operations of 1905 may be performed by a grant component as described with reference to FIGS. 11 through 14.

At 1910, the UE may receive a second ULCG configuration corresponding to a second value of the CORESET pool index different from the first value of the CORESET pool index. The operations of 1910 may be performed according to the methods described herein. In some examples, aspects of the operations of 1910 may be performed by a grant component as described with reference to FIGS. 11 through 14.

At 1915, the UE may transmit a first uplink transmission during a first uplink grant occasion according to the first ULCG configuration and a second uplink transmission during a second uplink grant occasion according to the second ULCG configuration, where both the first uplink transmission and the second uplink transmission correspond to a same transport block and a HARQ identifier. The operations of 1915 may be performed according to the methods described herein. In some examples, aspects of the operations of 1915 may be performed by an uplink component as described with reference to FIGS. 11 through 14.

Figure 20:
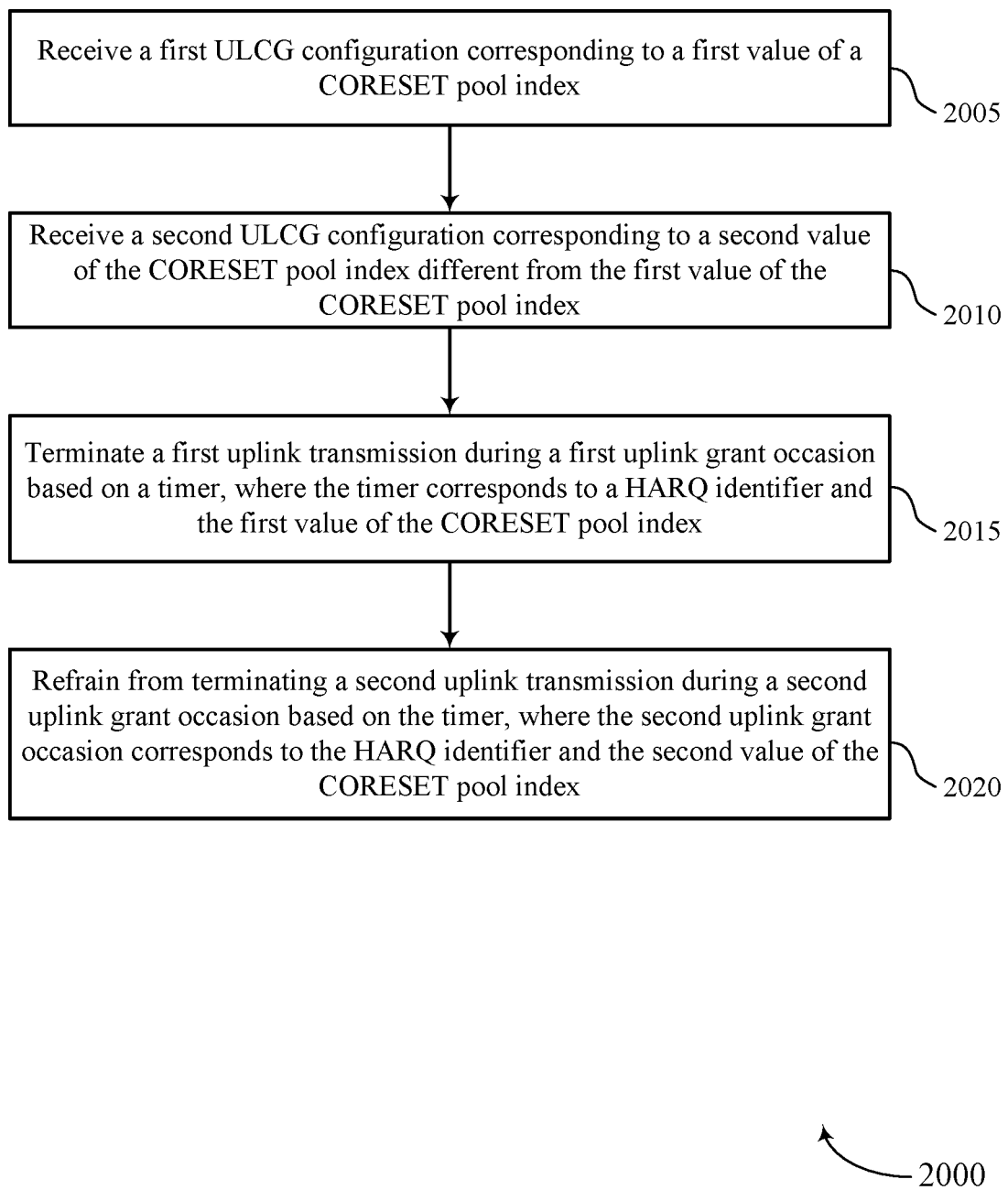

FIG. 20 shows a flowchart illustrating a method 2000 in accordance with aspects of the present disclosure. The operations of method 2000 may be implemented by a UE 115 or its components as described herein. For example, the operations of method 2000 may be performed by a UE communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 2005, the UE may receive a first ULCG configuration corresponding to a first value of a CORESET pool index. The operations of 2005 may be performed according to the methods described herein. In some examples, aspects of the operations of 2005 may be performed by a grant component as described with reference to FIGS. 11 through 14.

At 2010, the UE may receive a second ULCG configuration corresponding to a second value of the CORESET pool index different from the first value of the CORESET pool index. The operations of 2010 may be performed according to the methods described herein. In some examples, aspects of the operations of 2010 may be performed by a grant component as described with reference to FIGS. 11 through 14.

At 2015, the UE may terminate a first uplink transmission during a first uplink grant occasion based on a timer, where the timer corresponds to a HARQ identifier and the first value of the CORESET pool index. The operations of 2015 may be performed according to the methods described herein. In some examples, aspects of the operations of 2015 may be performed by a timer component as described with reference to FIGS. 11 through 14.

At 2020, the UE may refrain from terminating a second uplink transmission during a second uplink grant occasion based on the timer, where the second uplink grant occasion corresponds to the HARQ identifier and the second value of the CORESET pool index. The operations of 2020 may be performed according to the methods described herein. In some examples, aspects of the operations of 2020 may be performed by a timer component as described with reference to FIGS. 11 through 14.

Figure 21:
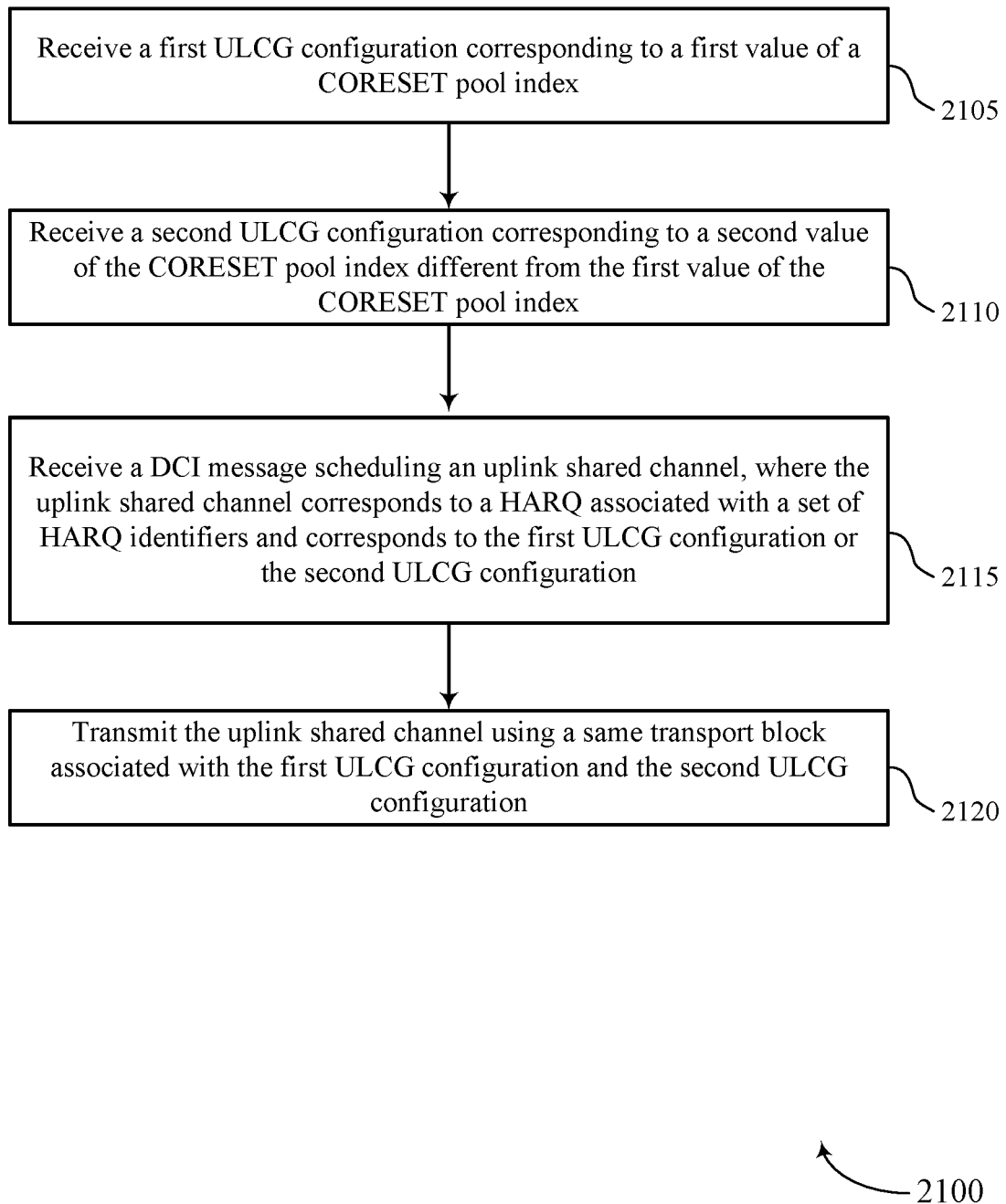

FIG. 21 shows a flowchart illustrating a method 2100 in accordance with aspects of the present disclosure. The operations of method 2100 may be implemented by a UE 115 or its components as described herein. For example, the operations of method 2100 may be performed by a UE communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 2105, the UE may receive a first ULCG configuration corresponding to a first value of a CORESET pool index. The operations of 2105 may be performed according to the methods described herein. In some examples, aspects of the operations of 2105 may be performed by a grant component as described with reference to FIGS. 11 through 14.

At 2110, the UE may receive a second ULCG configuration corresponding to a second value of the CORESET pool index different from the first value of the CORESET pool index. The operations of 2110 may be performed according to the methods described herein. In some examples, aspects of the operations of 2110 may be performed by a grant component as described with reference to FIGS. 11 through 14.

At 2115, the UE may receive a DCI message scheduling an uplink shared channel, where the uplink shared channel corresponds to a HARQ associated with a set of HARQ identifiers and corresponds to the first ULCG configuration or the second ULCG configuration. The operations of 2115 may be performed according to the methods described herein. In some examples, aspects of the operations of 2115 may be performed by a downlink component as described with reference to FIGS. 11 through 14.

At 2120, the UE may transmit the uplink shared channel using the same transport block associated with the first ULCG configuration and the second ULCG configuration. The operations of 2120 may be performed according to the methods described herein. In some examples, aspects of the operations of 2120 may be performed by a downlink component as described with reference to FIGS. 11 through 14.

Figure 22:
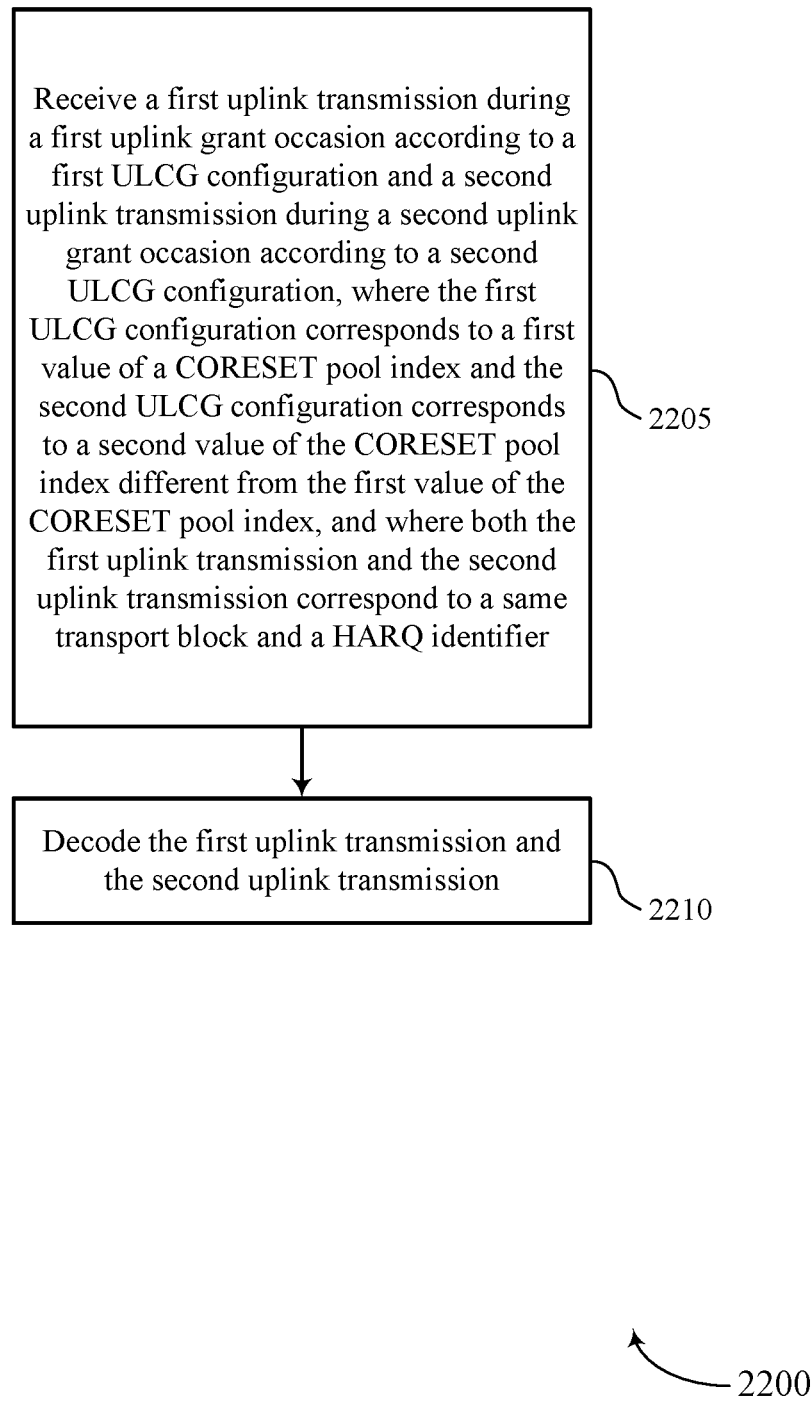

FIG. 22 shows a flowchart illustrating a method 2200 in accordance with aspects of the present disclosure. The operations of method 2200 may be implemented by a base station 105 or its components as described herein. For example, the operations of method 2200 may be performed by a base station communications manager as described with reference to FIGS. 15 through 18. In some examples, a base station may execute a set of instructions to control the functional elements of the base station to perform the functions described herein. Additionally or alternatively, a base station may perform aspects of the functions described herein using special-purpose hardware.

At 2205, the base station may receive a first uplink transmission during a first uplink grant occasion according to a first ULCG configuration and a second uplink transmission during a second uplink grant occasion according to a second ULCG configuration, where the first ULCG configuration corresponds to a first value of a CORESET pool index and the second ULCG configuration corresponds to a second value of the CORESET pool index different from the first value of the CORESET pool index, and where both the first uplink transmission and the second uplink transmission correspond to a same transport block and a HARQ identifier. The operations of 2205 may be performed according to the methods described herein. In some examples, aspects of the operations of 2205 may be performed by an uplink component as described with reference to FIGS. 15 through 18.

At 2210, the base station may decode the first uplink transmission and the second uplink transmission. The operations of 2210 may be performed according to the methods described herein. In some examples, aspects of the operations of 2210 may be performed by a decoding component as described with reference to FIGS. 15 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" may not be construed as a reference to a closed set of conditions. For example, an example step that is described as "based on condition A" may be based on both a condition A and a condition B without departing from the scope of the present disclosure. In other words, as used herein, the phrase "based on" may be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at user equipment (UE), comprising:
receiving a first uplink configured grant configuration corresponding to a first value of a control resource set pool index;
receiving a second uplink configured grant configuration corresponding to a second value of the control resource set pool index different from the first value of the control resource set pool index; and
transmitting a first uplink transmission during a first uplink grant occasion according to the first uplink configured grant configuration and a second uplink transmission during a second uplink grant occasion according to the second uplink configured grant configuration, wherein both the first uplink transmission and the second uplink transmission correspond to a same transport block and a hybrid automatic repeat request identifier.

2. The method of claim 1, wherein the first uplink configured grant configuration and the second uplink configured grant configuration are configured with a same set of hybrid automatic repeat request identifiers, wherein the set of hybrid automatic repeat request identifiers includes the hybrid automatic repeat request identifier associated with the first uplink grant occasion and the second uplink grant occasion.

3. The method of claim 2, further comprising:
maintaining a timer associated with one or both of the hybrid automatic repeat request identifier and one or more of the first value of the control resource set pool index or the second value of the control resource set pool index.

4. The method of claim 2, further comprising:
terminating the first uplink transmission during the first uplink grant occasion based at least in part on a timer, wherein the timer corresponds to the hybrid automatic repeat request identifier and the first value of the control resource set pool index.

5. The method of claim 4, further comprising:
refraining from terminating the second uplink transmission during the second uplink grant occasion based at least in part on the timer, wherein the second uplink grant occasion corresponds to the hybrid automatic repeat request identifier and the second value of the control resource set pool index.

6. The method of claim 4, further comprising:
transmitting, based at least in part on a value of a new data indicator being unchanged, the second uplink transmission during the second uplink grant occasion and according to the second uplink configured grant configuration using the same transport block.

7. The method of claim 2, further comprising:
receiving a third uplink configured grant configuration associated with a third uplink grant occasion and corresponding to the hybrid automatic repeat request identifier, wherein the hybrid automatic repeat request identifier is associated with the first uplink configured grant configuration, the second uplink configured grant configuration, and the third uplink configured grant configuration.

8. The method of claim 7, wherein the third uplink configured grant configuration is noncorresponding to one or both of the first value and the second value of the control resource set pool index.

9. The method of claim 8, further comprising:
associating the first value of the control resource set pool index with the third uplink configured grant configuration based at least in part on determining that the third uplink configured grant configuration is noncorresponding to one or both of the first value and the second value of the control resource set pool index.

10. The method of claim 8, further comprising:
terminating a third uplink transmission during the third uplink grant occasion based at least in part on a timer, wherein the timer corresponds to the hybrid automatic repeat request identifier.

11. The method of claim 10, wherein the timer is irrespective of one or both of the first value and the second value of the control resource set pool index.

12. The method of claim 8, further comprising:
transmitting a third uplink transmission during the third uplink grant occasion based at least in part on a timer, wherein the timer corresponds to the hybrid automatic repeat request identifier.

13. The method of claim 12, wherein the timer is irrespective of one or both of the first value and the second value of the control resource set pool index.

14. The method of claim 12, further comprising:
transmitting a third uplink transmission using the same transport block during the third uplink grant occasion based at least in part on a value of the new data indicator being unchanged.

15. The method of claim 1, further comprising:
determining, based at least in part on one or more scheduling parameters, one or both of a first transport block size for a first transport block associated with the first uplink grant occasion and a second transport block size for a second transport block associated with the second uplink grant occasion.

16. The method of claim 15, wherein the first transport block size and the second transport block size are a same transport block size, and wherein transmitting the first uplink transmission and the second uplink transmission using the same transport block is based at least in part on the that the first transport block size and the second transport block size are the same transport block size.

17. The method of claim 15, wherein the one or more scheduling parameters comprises a modulation and coding scheme, a frequency domain resource assignment, a time domain resource assignment, a number of layers, or a combination thereof.

18. The method of claim 1, further comprising:
receiving a downlink control information message scheduling an uplink shared channel, wherein the uplink shared channel corresponds to the hybrid automatic repeat request identifier associated with a set of hybrid automatic repeat request identifiers and corresponds to the first uplink configured grant configuration or the second uplink configured grant configuration; and
transmitting the uplink shared channel using the same transport block.

19. The method of claim 18, further comprising:
determining that the scheduled uplink shared channel corresponds to the first value of the control resource set pool index or the second value of the control resource set pool index based at least in part on a control resource set pool index associated with a control resource set that the downlink control information message is received.

20. The method of claim 19, further comprising:
activating a timer associated with the first uplink configured grant configuration or the second uplink configured grant configuration.

21. The method of claim 20, further comprising:
reactivating the timer based at least in part on the received downlink control information message scheduling the uplink shared channel.

22. The method of claim 20, further comprising:
reactivating the timer based at least in part on transmitting the uplink shared channel.

23. The method of claim 18, wherein the downlink control information message is scrambled with a configured-scheduling radio network temporary identifier.

24. The method of claim 1, wherein the first uplink configured grant configuration and the second uplink configured grant configuration are associated with a same periodicity.

25. The method of claim 1, further comprising:
receiving, via higher layer signaling, a configuration comprising a first association between the first value of the control resource set pool index and the first uplink configured grant configuration and a second association between the second value of the control resource set pool index and the second uplink configured grant configuration.

26. The method of claim 25, further comprising:
receiving a downlink control information message in a control resource set,
wherein the received downlink control information message activates the first uplink configured grant configuration or the second uplink configured grant configuration based at least in part on a value of the control resource pool index of the control resource set associated with the received downlink control information message, and the value of the control resource set pool index corresponds to the first value or the second value.

27. A method for wireless communication at base station, comprising:
receiving a first uplink transmission during a first uplink grant occasion according to a first uplink configured grant configuration and a second uplink transmission during a second uplink grant occasion according to a second uplink configured grant configuration, wherein the first uplink configured grant configuration corresponds to a first value of a control resource set pool index and the second uplink configured grant configuration corresponds to a second value of the control resource set pool index different from the first value of the control resource set pool index, and wherein both the first uplink transmission and the second uplink transmission correspond to a same transport block and a hybrid automatic repeat request identifier; and
decoding the first uplink transmission and the second uplink transmission.

28. The method of claim 27, wherein the first uplink configured grant configuration and the second uplink configured grant configuration are configured with a same set of hybrid automatic repeat request identifiers, wherein the set of hybrid automatic repeat request identifiers includes the hybrid automatic repeat request identifier associated with the first uplink grant occasion and the second uplink grant occasion.

29. An apparatus for wireless communication, comprising:
a processor,
memory coupled with the processor; and
instructions stored in the memory and executable by the processor to cause the apparatus to:
receive a first uplink configured grant configuration corresponding to a first value of a control resource set pool index;
receive a second uplink configured grant configuration corresponding to a second value of the control resource set pool index different from the first value of the control resource set pool index; and
transmit a first uplink transmission during a first uplink grant occasion according to the first uplink configured grant configuration and a second uplink transmission during a second uplink grant occasion according to the second uplink configured grant configuration, wherein both the first uplink transmission and the second uplink transmission correspond to a same transport block and a hybrid automatic repeat request identifier.

30. An apparatus for wireless communication, comprising:
a processor,
memory coupled with the processor; and
instructions stored in the memory and executable by the processor to cause the apparatus to:
receive a first uplink transmission during a first uplink grant occasion according to a first uplink configured grant configuration and a second uplink transmission during a second uplink grant occasion according to a second uplink configured grant configuration, wherein the first uplink configured grant configuration corresponds to a first value of a control resource set pool index and the second uplink configured grant configuration corresponds to a second value of the control resource set pool index different from the first value of the control resource set pool index, and wherein both the first uplink transmission and the second uplink transmission correspond to a same transport block and a hybrid automatic repeat request identifier; and
decode the first uplink transmission and the second uplink transmission.

* * * * *